US008226468B2

(12) United States Patent

Hoffman et al.

(10) Patent No.: US 8,226,468 B2

(45) Date of Patent: Jul. 24, 2012

(54) GAMING SYSTEM AND METHOD INCLUDING POINTS OF SYMBOL EXPANSION

(75) Inventors: Benjamin C. Hoffman, Reno, NV (US); Paulina Rodgers, Reno, NV (US); Christmas C. Parker, Reno, NV (US)

(73) Assignee: IGT, Reno, NV (US)

( * ) Notice: Subject to any disclaimer, the term of this patent is extended or adjusted under 35 U.S.C. 154(b) by 903 days.

(21) Appl. No.: 12/270,250

(22) Filed: Nov. 13, 2008

(65) Prior Publication Data

US 2010/0120501 A1 May 13, 2010

(51) Int. Cl.

*A63F 9/24* (2006.01)
*A63F 13/00* (2006.01)
*G06F 17/00* (2006.01)
*G06F 19/00* (2006.01)

(52) U.S. Cl. ................. 463/20; 463/21; 463/25; 463/31

(58) Field of Classification Search ..................... 463/20
See application file for complete search history.

(56) References Cited

U.S. PATENT DOCUMENTS 1,564,746 A 12/1925 Barnard
3,977,681 A 8/1976 Deitrich
4,099,722 A 7/1978 Rodesch et al.
4,114,890 A 9/1978 Yamamoto et al.
4,171,814 A 10/1979 Tamano
4,200,291 A 4/1980 Hooker
4,448,419 A 5/1984 Telnaes
4,573,681 A 3/1986 Okada
4,636,951 A 1/1987 Harlick
4,651,996 A 3/1987 Watkins, Jr.
4,838,552 A 6/1989 Hagiwara
RE34,244 E 5/1993 Hagiwara
5,308,065 A 5/1994 Bridgeman et al.
5,332,228 A 7/1994 Schultz
5,393,061 A 2/1995 Manship et al.
5,395,111 A 3/1995 Inoue (Continued)

FOREIGN PATENT DOCUMENTS

AU 2005225042 5/2006

(Continued)

OTHER PUBLICATIONS

50 Lions Advertisement, written by Aristocrat, published in Sep. 2004.

(Continued)

*Primary Examiner* — Dmitry Suhol
*Assistant Examiner* — Kevin Y Kim
(74) *Attorney, Agent, or Firm* — Neal, Gerber & Eisenberg LLP

(57) ABSTRACT

Various embodiments of the disclosed gaming system and method include the gaming system randomly generating a plurality of symbols, displaying the generated symbols and prior to determining any awards for a play of a game, determining whether an expanding symbol is displayed at one or more points of symbol expansion. If the expanding symbol is displayed at the point of symbol expansion, the gaming system causes the expanding symbol to "expand," replacing at least another one of the displayed symbols. After the gaming system causes the symbol expansions, the gaming system evaluates the symbols for winning symbol combinations, determines any awards associated with the winning symbol combinations, and provides the player with any determined awards. In various embodiments, the point of symbol expansion is a symbol position.

38 Claims, 21 Drawing Sheets

U.S. PATENT DOCUMENTS 5,423,539 A 6/1995 Nagao
5,431,408 A 7/1995 Adams
5,449,173 A 9/1995 Thomas et al.
5,564,700 A 10/1996 Celona
5,580,053 A 12/1996 Crouch
5,584,764 A 12/1996 Inoue
5,609,524 A 3/1997 Inoue
5,611,535 A 3/1997 Tiberio
5,704,835 A 1/1998 Dietz, II
5,720,662 A 2/1998 Holmes, Jr. et al.
5,722,891 A 3/1998 Inoue
5,752,881 A 5/1998 Inoue
5,766,074 A 6/1998 Cannon et al.
5,769,716 A 6/1998 Saffari et al.
5,807,172 A 9/1998 Piechowiak
5,823,873 A 10/1998 Moody
5,833,238 A 11/1998 Watanabe
5,833,536 A 11/1998 Davids et al.
5,833,537 A 11/1998 Barrie
5,863,249 A 1/1999 Inoue
5,902,184 A 5/1999 Bennett
5,927,714 A 7/1999 Kaplan
5,935,002 A 8/1999 Falciglia
5,951,397 A 9/1999 Dickinson
5,980,384 A 11/1999 Barrie
5,984,782 A 11/1999 Inoue
6,027,115 A 2/2000 Griswold et al.
6,056,642 A 5/2000 Bennett
6,059,658 A 5/2000 Mangano et al.
6,086,066 A 7/2000 Takeuchi et al.
6,089,977 A 7/2000 Bennett
6,093,102 A 7/2000 Bennett
6,117,013 A 9/2000 Eiba
6,120,031 A 9/2000 Adams
6,149,521 A 11/2000 Sanduski
6,159,095 A 12/2000 Frohm et al.
6,174,235 B1 1/2001 Walker et al.
6,190,254 B1 2/2001 Bennett
6,220,959 B1 4/2001 Holmes, Jr. et al.
6,224,484 B1 5/2001 Okuda et al.
6,227,971 B1 5/2001 Weiss
6,241,607 B1 6/2001 Payne et al.
6,251,013 B1 6/2001 Bennett
6,290,600 B1 9/2001 Glasson
6,299,165 B1 10/2001 Nagano
6,299,170 B1 10/2001 Yoseloff
6,302,398 B1 10/2001 Vecchio
6,311,976 B1 11/2001 Yoseloff et al.
6,319,124 B1 11/2001 Baerlocher et al.
6,322,078 B1 11/2001 Adams
6,358,144 B1 3/2002 Kaddlic et al.
6,364,766 B1 4/2002 Anderson et al.
6,398,644 B1 6/2002 Perrie et al.
6,409,602 B1 6/2002 Wilshire et al.
6,413,162 B1 7/2002 Baerlocher et al.
6,416,408 B2 7/2002 Tracy et al.
6,419,579 B1 7/2002 Bennett
6,428,412 B1 8/2002 Anderson et al.
6,439,993 B1 * 8/2002 O'Halloran .................... 463/16
6,439,995 B1 8/2002 Hughs-Baird et al.
6,454,266 B1 9/2002 Breeding et al.
6,461,241 B1 10/2002 Webb et al.
6,494,454 B2 12/2002 Adams
6,506,114 B1 1/2003 Estes et al.
6,514,141 B1 2/2003 Kaminkow et al.
6,517,432 B1 2/2003 Jaffe
6,517,433 B2 2/2003 Loose et al.
6,551,187 B1 4/2003 Jaffe
6,561,904 B2 5/2003 Locke et al.
6,565,433 B1 5/2003 Baerlocher
6,585,591 B1 7/2003 Baerlocher et al.
6,599,185 B1 7/2003 Kaminkow et al.
6,604,740 B1 8/2003 Singer et al.
6,616,142 B2 9/2003 Adams
6,634,945 B2 10/2003 Glavich et al.
6,644,663 B2 11/2003 Seelig et al.
6,676,511 B2 1/2004 Payne et al.
6,719,630 B1 4/2004 Seelig et al.
6,726,204 B2 4/2004 Inoue
6,731,313 B1 5/2004 Kaminkow
6,780,109 B2 8/2004 Kaminkow
6,805,349 B2 10/2004 Baerlocher et al.
6,835,133 B2 12/2004 Baerlocher et al.
6,855,054 B2 2/2005 White et al.
6,866,583 B2 3/2005 Glavich et al.
6,880,826 B2 4/2005 Inoue
6,899,620 B2 5/2005 Kaminkow et al.
6,905,406 B2 6/2005 Kaminkow et al.
6,918,832 B2 7/2005 Baerlocher et al.
6,921,335 B2 7/2005 Rodgers et al.
6,923,441 B2 8/2005 Inoue
6,932,700 B2 8/2005 Bennett et al.
6,942,572 B2 9/2005 Inoue
6,960,133 B1 11/2005 Marks et al.
6,976,915 B2 12/2005 Baker et al.
6,981,635 B1 1/2006 Hughs-Baird et al.
6,988,947 B2 1/2006 Baerlocher et al.
6,997,808 B2 2/2006 Rodgers et al.
7,001,274 B2 2/2006 Baerlocher et al.
7,014,560 B2 3/2006 Glavich et al.
7,018,293 B2 3/2006 Brown et al.
7,048,275 B2 5/2006 Adams
7,056,213 B2 6/2006 Ching et al.
7,070,502 B1 * 7/2006 Bussick et al. .................. 463/20
7,074,127 B2 7/2006 Cuddy et al.
7,077,744 B2 7/2006 Cannon
7,077,745 B2 7/2006 Gomez et al.
7,090,580 B2 8/2006 Rodgers et al.
7,094,148 B2 8/2006 Baerlocher et al.
7,137,888 B2 11/2006 Glavich et al.
7,144,322 B2 12/2006 Gomez et al.
7,160,187 B2 1/2007 Loose et al.
7,160,188 B2 1/2007 Kaminkow et al.
7,166,028 B2 1/2007 Fasbender et al.
7,168,704 B1 1/2007 Lawless
7,169,042 B2 1/2007 Muir et al.
7,204,753 B2 4/2007 Ozaki et al.
7,226,359 B2 6/2007 Bussick et al.
7,252,591 B2 8/2007 Van Asdale
7,252,592 B2 8/2007 Rodgers et al.
7,275,988 B2 10/2007 Aida et al.
7,331,862 B2 2/2008 Rodgers et al.
7,331,866 B2 2/2008 Rodgers et al.
7,396,279 B2 7/2008 Berman et al.
7,399,225 B2 7/2008 Kaminkow
7,758,414 B1 * 7/2010 Marks et al. .................... 463/20
2002/0068623 A1 6/2002 Gauselmann
2002/0077165 A1 6/2002 Bansemer et al.
2002/0160836 A1 10/2002 Watanabe et al.
2003/0054874 A1 3/2003 Kaminkow
2003/0057645 A1 3/2003 Baerlocher et al.
2003/0060267 A1 3/2003 Glavich et al.
2003/0100356 A1 5/2003 Brown et al.
2003/0125100 A1 7/2003 Cannon
2003/0203752 A1 10/2003 Kaminkow et al.
2003/0203753 A1 10/2003 Muir et al.
2004/0033829 A1 2/2004 Pacey et al.
2004/0048650 A1 3/2004 Mierau et al.
2004/0053676 A1 3/2004 Rodgers
2004/0198489 A1 10/2004 Kaminkow et al.
2004/0242313 A1 12/2004 Munoz
2005/0049035 A1 3/2005 Baerlocher et al.
2005/0054405 A1 3/2005 Baerlocher et al.
2005/0054418 A1 3/2005 Baerlocher et al.
2005/0059477 A1 3/2005 Baerlocher
2005/0059478 A1 3/2005 Peterson et al.
2005/0064924 A1 3/2005 Glavich et al.
2005/0192081 A1 9/2005 Marks et al.
2005/0227754 A1 10/2005 Kaminkow et al.
2005/0282620 A1 12/2005 Marks et al.
2005/0288094 A1 12/2005 Marks et al.
2006/0019738 A1 1/2006 Baerlocher et al.
2006/0030392 A1 2/2006 Rodgers et al.
2006/0040728 A1 2/2006 Fuller
2006/0046830 A1 3/2006 Webb
2006/0068884 A1 3/2006 Baerlocher et al.
2006/0068885 A1 3/2006 Cregan et al.

| | | | |
|---|---|---|---|
| 2006/0073872 A1 | 4/2006 | B-Jensen et al. | |
| 2006/0084492 A1 | 4/2006 | Baerlocher et al. | |
| 2006/0084498 A1 | 4/2006 | Baerlocher et al. | |
| 2006/0089191 A1 | 4/2006 | Singer et al. | |
| 2006/0111174 A1 | 5/2006 | Baerlocher et al. | |
| 2006/0116195 A1 | 6/2006 | Baerlocher et al. | |
| 2006/0135247 A1 | 6/2006 | Baerlocher et al. | |
| 2006/0172795 A1 | 8/2006 | Bussick et al. | |
| 2006/0199636 A1 | 9/2006 | Ching et al. | |
| 2006/0199637 A1 | 9/2006 | Ching et al. | |
| 2006/0246977 A1 | 11/2006 | Cannon | |
| 2007/0004489 A1 | 1/2007 | Rodgers et al. | |
| 2007/0010316 A1 | 1/2007 | Baerlocher et al. | |
| 2007/0021175 A1 | 1/2007 | Rodgers et al. | |
| 2007/0021188 A1 | 1/2007 | Rodgers et al. | |
| 2007/0060246 A1 | 3/2007 | Baerlocher et al. | |
| 2007/0060248 A1 | 3/2007 | Rodgers et al. | |
| 2007/0060294 A1 | 3/2007 | Cuddy et al. | |
| 2007/0087812 A1 | 4/2007 | Glavich et al. | |
| 2007/0129131 A1 | 6/2007 | Kaminkow et al. | |
| 2008/0108411 A1 | 5/2008 | Jensen et al. | |
| 2008/0139298 A1 | 6/2008 | Rodgers et al. | |

FOREIGN PATENT DOCUMENTS

| | | |
|---|---|---|
| CA | 2403 032 | 3/2003 |
| EP | 058488 | 8/1982 |
| EP | 1 063 622 | 12/2000 |
| EP | 1 205 894 | 5/2002 |
| EP | 1 498 859 | 1/2005 |
| GB | 1 454 046 | 10/1976 |
| GB | 2 062 922 | 5/1981 |
| GB | 2 106 293 | 9/1981 |
| GB | 2 097 160 | 10/1982 |
| GB | 2 106 295 | 4/1983 |
| GB | 2 165 385 | 4/1986 |
| GB | 2 243 236 | 4/1990 |
| GB | 2 372 132 | 2/2001 |
| GB | 2 372 617 | 8/2002 |
| WO | WO 97/32285 | 9/1997 |
| WO | WO 98/20949 | 5/1998 |
| WO | WO 00/30727 | 6/2000 |
| WO | WO 00/66235 | 11/2000 |
| WO | WO 01/21268 | 3/2001 |
| WO | WO 01/28647 | 4/2001 |
| WO | WO 2007/053349 | 5/2007 |

OTHER PUBLICATIONS

50 Lions, Article in Strictly Slots, published in Apr. 2005.

Break the Spell, Article in Strictly Slots, published in Sep. 2000.

Enchanted Unicorn Advertisement, written by IGT, published in 2001.

Splash Party Advertisement, Article in Strictly Slots, published in Feb. 2005.

The Addam's Family—Cousin It Advertisement, written by IGT, published in 2002.

* cited by examiner

GAMING SYSTEM AND METHOD INCLUDING POINTS OF SYMBOL EXPANSION

BACKGROUND

Various slot-type gaming machines are known. Slot gaming machines generally include a plurality of reels, or virtual reels, each including a plurality of symbols, the symbols displayable at a plurality of symbol positions. In known slot-type gaming machines, after a player places a wager on a game, the gaming machine randomly generates a plurality of symbols at the symbol positions. If a generated symbol or combination of symbols is a winning symbol or combination of symbols associated with an award, the player receives that award when the generated symbol or combination of symbols appears along an active payline associated with the reels or in a scatter pay.

One popular feature known gaming machines employ to increase players' award opportunities is an expanding symbol or expanding wild symbol. In certain gaming machines utilizing an expanding symbol, the gaming machine generates a plurality of symbols at a plurality of symbol positions. If the expanding symbol is generated at a designated area, the gaming machine causes the expanding symbol to "expand" and replace a symbol at an adjacent symbol position. After the gaming machine causes the expanding symbol to "expand," the gaming machine evaluates the symbols for winning symbols or symbol combinations and provides any determined awards to the player.

In certain gaming machines utilizing an expanding wild symbol, the employment of the expanding wild symbol is considered a "rich" feature, in that the expansion of the expanding symbol leads to relatively high awards. Accordingly, while players like expanding symbols, they are not utilized in many gaming machines because they consume too much of a game's paytable (e.g., create too many predetermined winning symbol combinations including one or more wild symbols).

There is a continuing need for new and exciting games.

SUMMARY

Various embodiments of the disclosed gaming system and method include the gaming system randomly generating a plurality of symbols, displaying the generated symbols and prior to determining any awards for a play of a game, determining whether an expanding symbol is displayed at one or more points of symbol expansion. If the expanding symbol is displayed at the point of symbol expansion, the gaming system causes the expanding symbol to "expand," replacing at least another one of the displayed symbols. After the gaming system causes the symbol expansions, the gaming system evaluates the symbols for winning symbol combinations, determines any awards associated with the winning symbol combinations, and provides the player with any determined awards. In various embodiments, the point of symbol expansion is a symbol position.

Various embodiments of the disclosed gaming system and method include a combination of both, what will be referred to herein, as "book-end" symbol expansion and symbol expansion resulting from an expanding symbol being displayed at a point of symbol expansion. For purposes of clarity, each of these types of symbol expansion are described at various points herein separately to provide a full understanding of each type of symbol expansion.

In one embodiment, one or more points of symbol expansion are identified for the player prior to the gaming system randomly generating the plurality of symbols for the play of the game. The point of symbol expansion is suitably identified such as by displaying a highlighted border surrounding the symbol position which is the point of symbol expansion, displaying a different colored background at the symbol position, or overlaying a designated image over the symbol position such that a symbol generated at the symbol position is still visible.

In this embodiment, after identifying the one or more points of symbol expansion to the player, the gaming system randomly generates and displays those generated symbols at a plurality of symbols at a plurality of symbol positions for a play of the game.

The gaming system determines if any of the expanding symbols are displayed at any of the points of symbol expansion. If one of the expanding symbols is displayed at a point of symbol expansion, the gaming system causes that expanding symbol to expand in one direction (e.g., vertically) to replace the symbols at each symbol position extending from the point of symbol expansion in that direction (e.g., if vertical symbol expansion, extending up, down, or up and down).

After the gaming system has caused any such expansions by the expanding symbol in one direction, the gaming system evaluates the symbols for winning symbol combinations and provides the player with any determined awards. It should be appreciated that in various embodiments, the expanding symbol may expand in any suitable direction (e.g, horizontally to the left, the right, or both to the left and right from the point of symbol expansion). In various other embodiments, the expanding symbol may expand in a plurality of directions.

In various embodiments disclosed herein, the gaming system also causes book-end symbol expansion. Book-end symbol expansion includes an expanding symbol "expanding" horizontally or vertically to fill gaps (i.e., replacing symbols in between two displayed expanding symbols). For example, in a horizontal application, if two expanding symbols are generated on each of two different reels which are separated by at least one reel, the expanding symbol "expands" and replaces all symbols at symbol positions along a path between the two displayed expanding symbols. In this embodiment, the path includes the symbol positions located along a horizontal line between the symbol positions at which the expanding symbols are generated.

In should be appreciated that in various such embodiments, the path between two generated expanding symbols may extend in a first direction (e.g., horizontally), a second different direction (e.g., vertically), along a payline, or in any suitable direction or combination of directions.

In one such embodiment, a book-end symbol expansion in a first direction can cause an expanding symbol to be displayed at one or more points of symbol expansion, which ultimately causes a symbol expansion in a second different direction. In other words, in such a game, the gaming system displays an expanding symbol at one or more points of symbol expansion as a result of one of: (a) randomly generating the expanding symbol at the point of symbol expansion as one of a plurality of randomly generated symbols, and (b) causing the expanding symbol to be displayed at the point of symbol expansion as a result of a book-end symbol expansion, but after an initial random generation of a plurality of symbols.

In one embodiment, the gaming system enables both a book-end horizontal symbol expansion and a vertical symbol expansion resulting from a display of an expanding symbol at a point of symbol expansion in a play of the game. The gaming system randomly generates and displays a plurality of symbols at a plurality of symbol positions. The gaming system first determines if two of a same expanding symbol have been generated at symbol positions of different reels, wherein the different reels are separated by at least one reel (i.e., whether to cause a book-end horizontal expansion). If the gaming system determines that a book-end horizontal symbol expansion has been triggered, the gaming system causes the expanding symbol to replace the symbols located along a path including a horizontal line between the symbol positions at which the expanding symbols are generated.

After the gaming system causes the book-end horizontal expansion (or if no book-end horizontal expansion is triggered), the gaming system determines if the expanding symbol is displayed at the one or more points of symbol expansion. If the expanding symbol is displayed at the at least one point of symbol expansion, the gaming system causes the expanding symbol to expand vertically to replace the symbols at each symbol position above and below the at least one point of symbol expansion.

After any book-end horizontal symbol expansions and vertical symbol expansions have taken place, the gaming system evaluates the symbols for winning symbol combinations and provides the player with any determined awards. The use of two types of symbol expansion appeals to players, which get not only the thrill of any caused book-end horizontal symbol expansions, but also the thrill of an expanding symbol being displayed at one or more points of symbol expansion as a result of the book-end horizontal symbol expansion. Generally, players will receive a relatively high award as a result of these two symbol expansions. The two symbol expansions are conditional and thus, alleviate issues of the symbol expansions being too "rich" a feature. The conditional nature of the symbol expansions results in higher, but less frequent, awards associated with the symbol expansions, appealing to high volatility players.

It should be appreciated that in various embodiments the gaming system evaluates the symbols for winning symbol combinations at one or more of the following points in time: (a) before any book-end symbol expansions or symbol expansions resulting from the expanding symbol being displayed at one or more points of symbol expansion; (b) after any book-end symbol expansions but before any symbol expansions resulting from the expanding symbol being displayed at one or more points of symbol expansion; and (c) after any book-end symbol expansions and any symbol expansions resulting from the expanding symbol being displayed at one or more points of symbol expansion. It should be appreciated that in various other embodiments, the gaming system evaluates the symbols for winning symbol combinations at one or more of the above times during game play, but the types of symbol expansion are in the opposite order or any suitable order (e.g., points of symbol expansion followed by book-end symbol expansion).

It should be appreciated that in various embodiments, the games described in any of the above examples or any example discussed herein may be a base game, a bonus or a free game.

Although in the above examples, the game includes one expanding symbol, it should be appreciated that in various other embodiments, the game includes a plurality of different expanding symbols.

Additional features and advantages are described herein, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
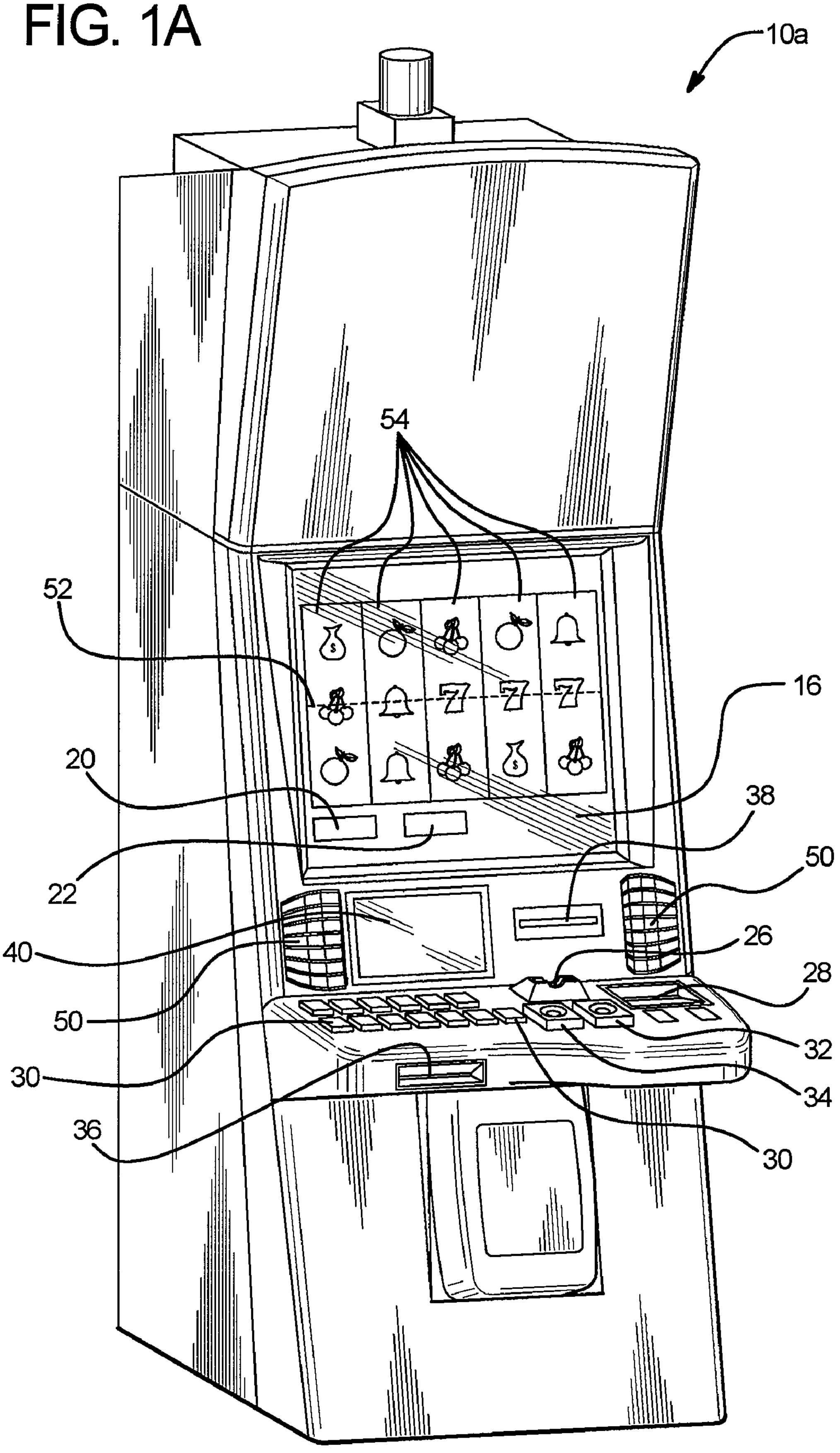
FIGS. 1A and 1B are front perspective views of alternative embodiments of gaming devices disclosed herein.
Figure 1B:
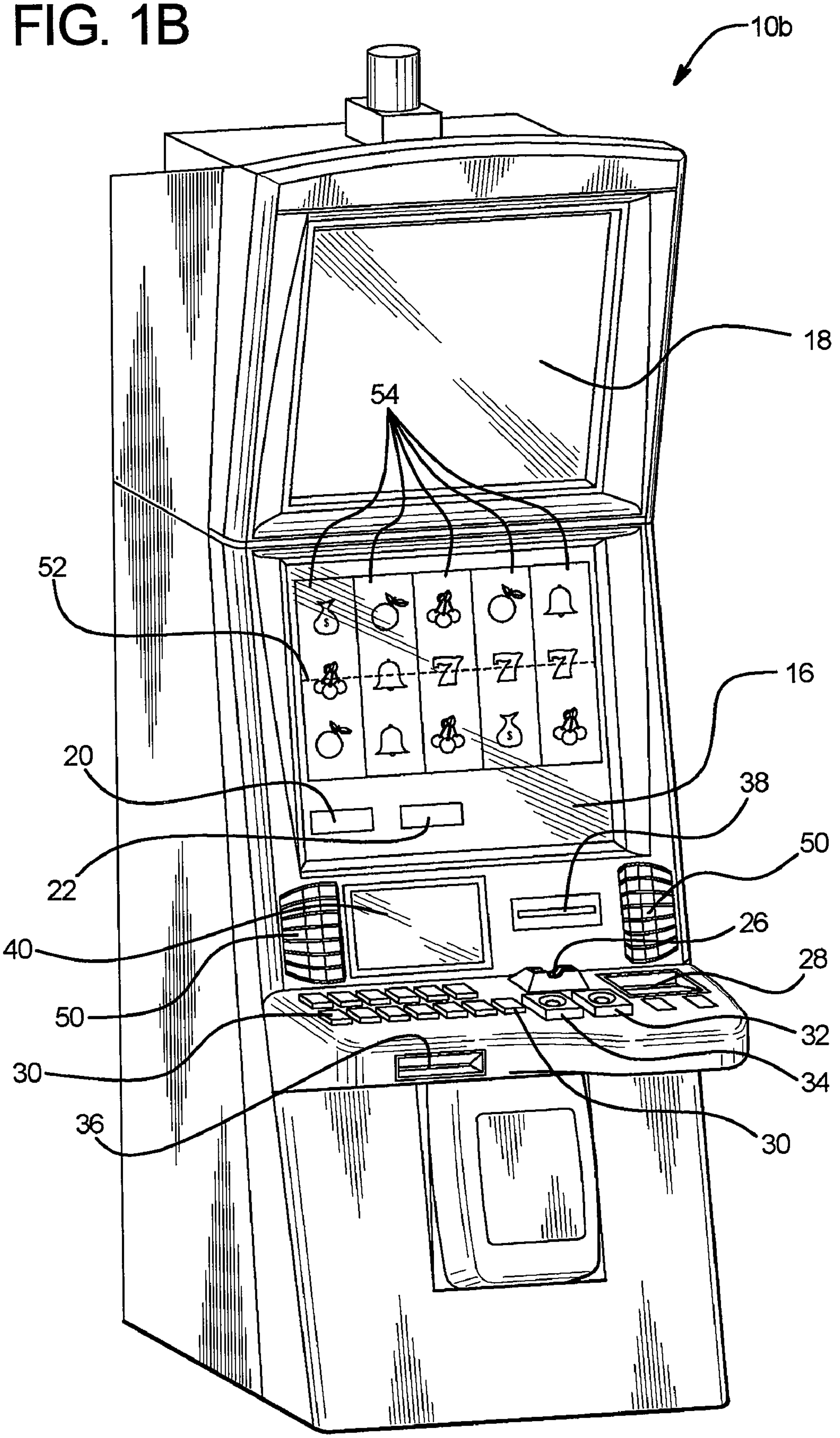

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
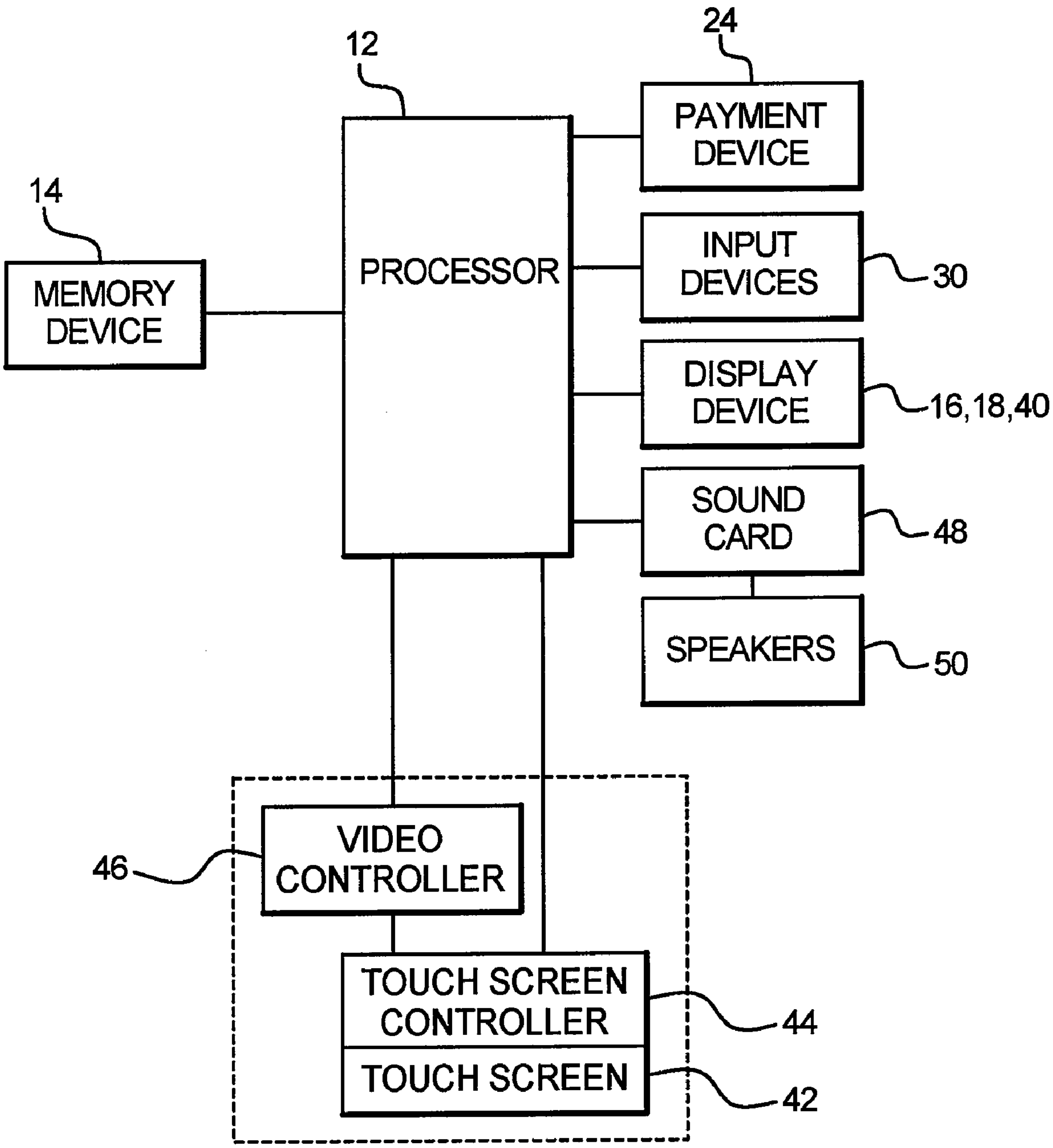
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
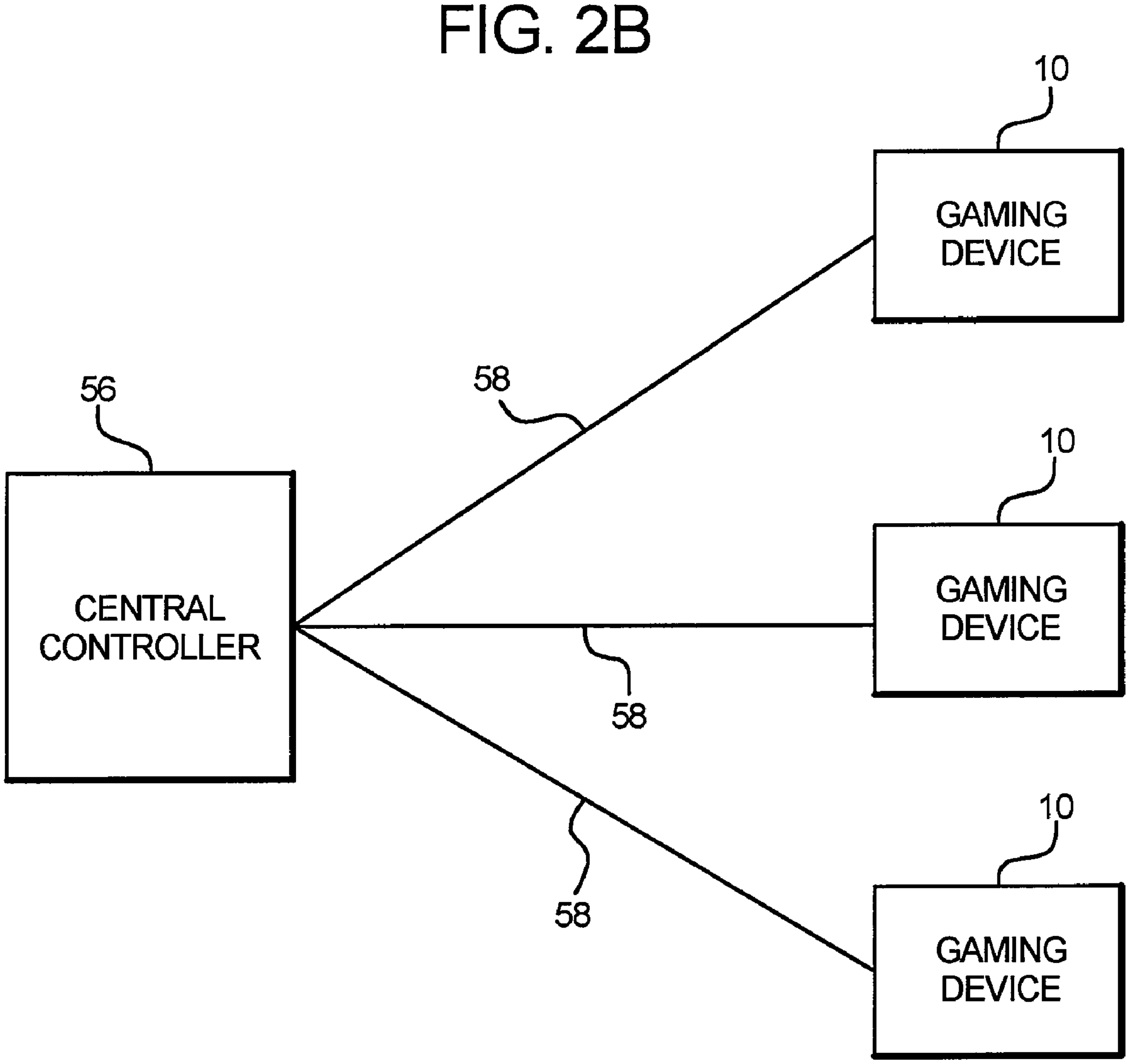
FIG. 2B is a schematic diagram of the central controller in communication with a plurality of gaming devices in accordance with one embodiment of the gaming system disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Points of Symbol Expansion Example Embodiments

Various embodiments of the disclosed gaming system and method include the gaming system randomly generating a plurality of symbols, displaying the generated symbols and prior to determining any awards for a play of a game, determining whether an expanding symbol is displayed at one or more points of symbol expansion. If the expanding symbol is displayed at the point of symbol expansion, the gaming system causes the expanding symbol to "expand," replacing at least another one of the displayed symbols. After the gaming system causes the symbol expansions, the gaming system evaluates the symbols for winning symbol combinations, determines any awards associated with the winning symbol combinations, and provides the player with any determined awards. In various embodiments, the point of symbol expansion is a symbol position.

Figure 3A:
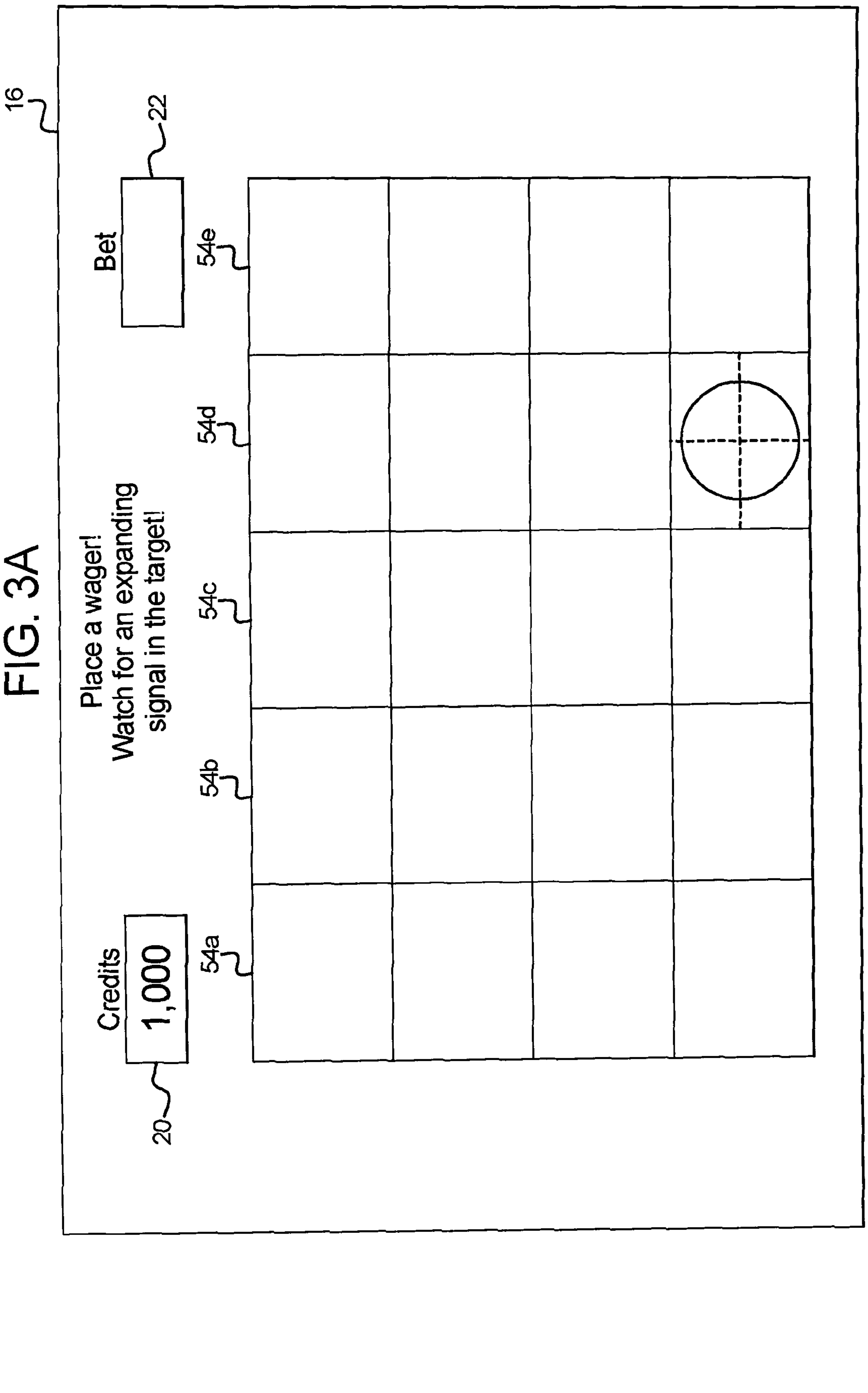
FIGS. 3A, 3B, 3C and 3D include front views of a gaming device display enabling a play of a wagering game in accordance with one of embodiment of the gaming system disclosed herein.

Referring now specifically to FIGS. 3A to 3E, in one embodiment, a point of symbol expansion is identified for the player prior to the gaming system randomly generating the plurality of symbols for the play of the game. In this embodiment, the point of symbol expansion located at reel 54*d* is a symbol position overlaid with a target-like image, as illustrated in FIG. 3A. In various other embodiments, the point of symbol expansion is identified such as by displaying a highlighted border surrounding the symbol position which is the point of symbol expansion, displaying a different colored background at the symbol position, or overlaying any suitable image over the symbol position such that a symbol generated at the symbol position is still visible.

It should be appreciated that in various other embodiments, the point of symbol expansion is not identified for the player until after the gaming system determines if the expanding symbol is displayed at the point of symbol expansion.

It should also be appreciated that in various embodiments, the gaming system randomly determines which symbol or symbols are a point of symbol expansion. In various other embodiments, the gaming system determines which symbol or symbols are a point of symbol expansion in other ways, such as based on: (a) probability tables; (b) ordered scenarios; (c) a same predetermined pattern of symbol positions; and (d) any suitable criteria.

The gaming system instructs the player to place a wager, as illustrated in FIG. 3A. The player inputs a wager of 100 credits as illustrated in bet display 22 in FIG. 3B. In this embodiment, a bet of 100 credits provides a player with 1,024 "ways to win" (the number of symbol positions at reel 54*a* multiplied by the number of symbol positions at reel 54*b* multiplied by the number of symbol positions at reel 54*c* multiplied by the number of symbol positions at reel 54*d* multiplied by the number of symbol positions at reel 54*e*). An explanation of how the gaming system evaluates "ways to win" for winning symbol combinations is provided above.

Figure 3B:
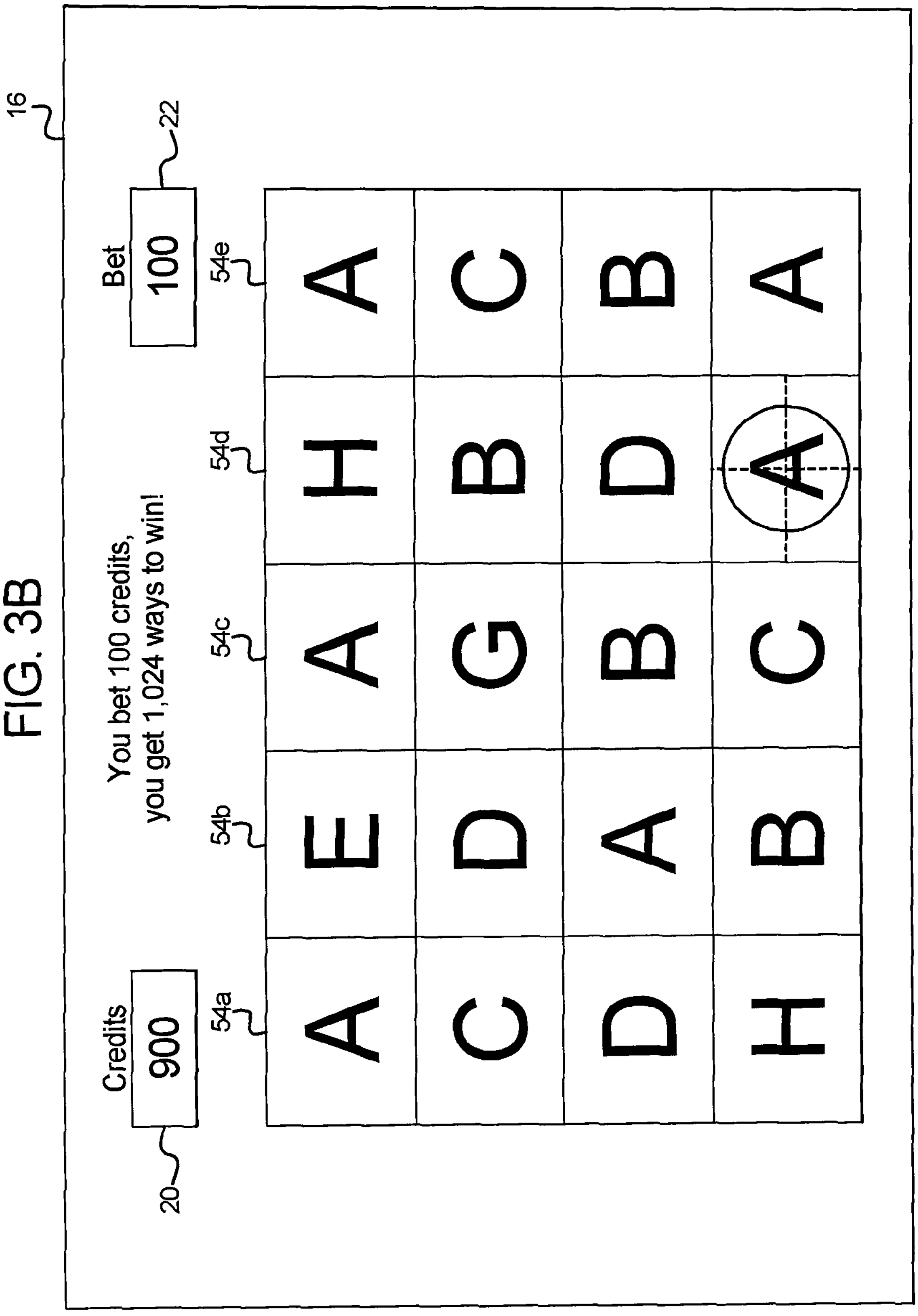
Figure 3C:
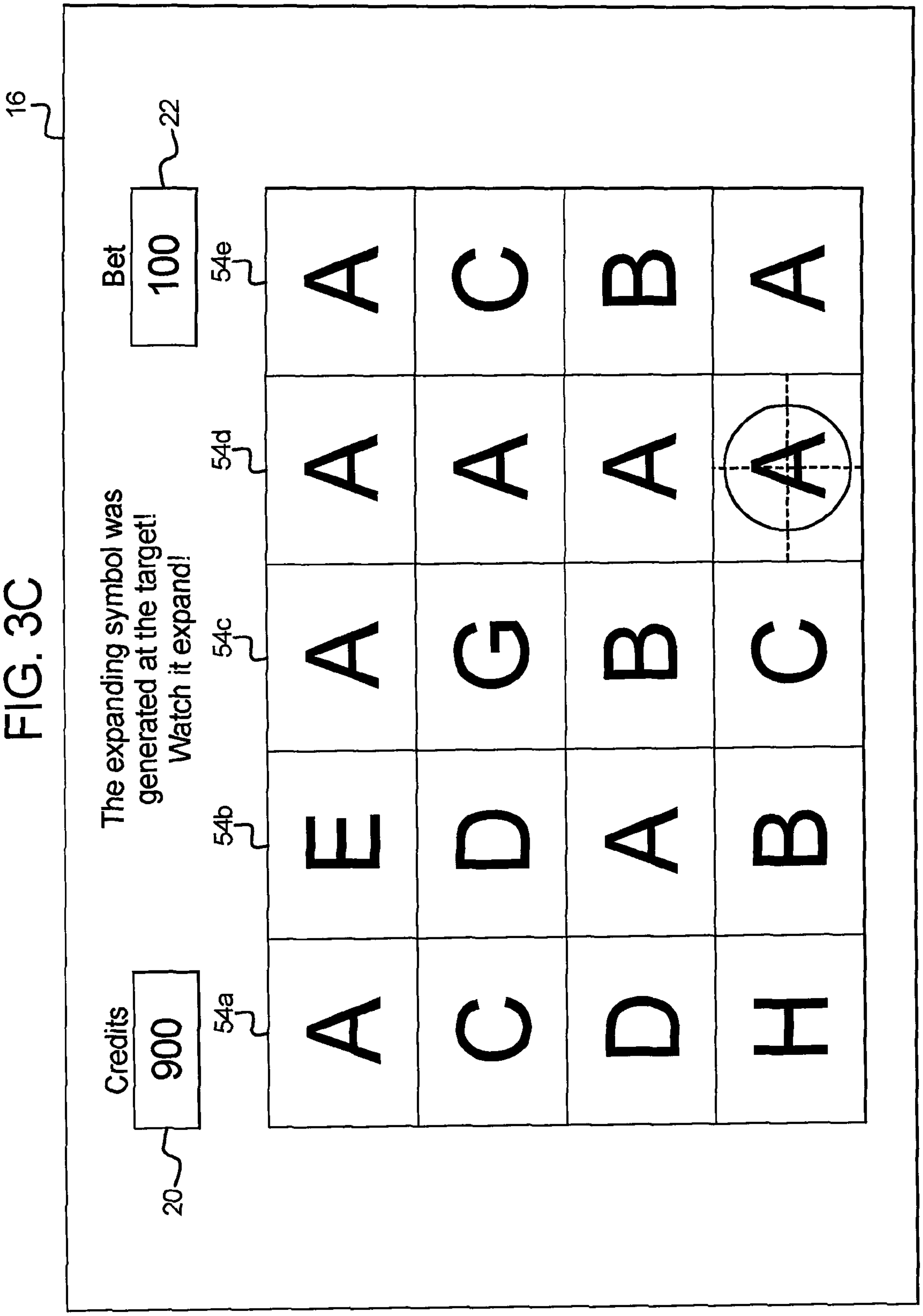

The gaming system randomly generates a plurality of symbols at a plurality of symbol positions for a play of the game, as illustrated in FIG. 3B. Then, the gaming system determines if the expanding symbol is displayed at the at least one point of symbol expansion at reel 54*d*. In this embodiment, if the expanding symbol is displayed at the at least one point of symbol expansion, the gaming system causes the expanding symbol to expand vertically to replace the symbols at each symbol position extending above and below the point of symbol expansion (in this example above since the point of symbol expansion is a lower-most symbol position of reel 54*d*), as illustrated in FIG. 3C.

It should be appreciated that in various other such embodiments, the expanding symbol may expand just vertically upward from the point of symbol expansion or vertically downward from the point of symbol expansion. It should be appreciated that in various other embodiments, the expanding symbol may expand in any suitable direction (e.g, horizontally to the left, the right, or both to the left and right from the point of symbol expansion). In various other embodiments, the expanding symbol may expand both horizontally and vertically if displayed at a point of symbol expansion.

It should also be appreciated that in various embodiments, the gaming system may cause an expanding symbol to expand if the expanding symbol is generated at a designated position relative to a point of symbol expansion (e.g., below a point of symbol expansion) instead of at the point of symbol expansion.

Figure 3D:
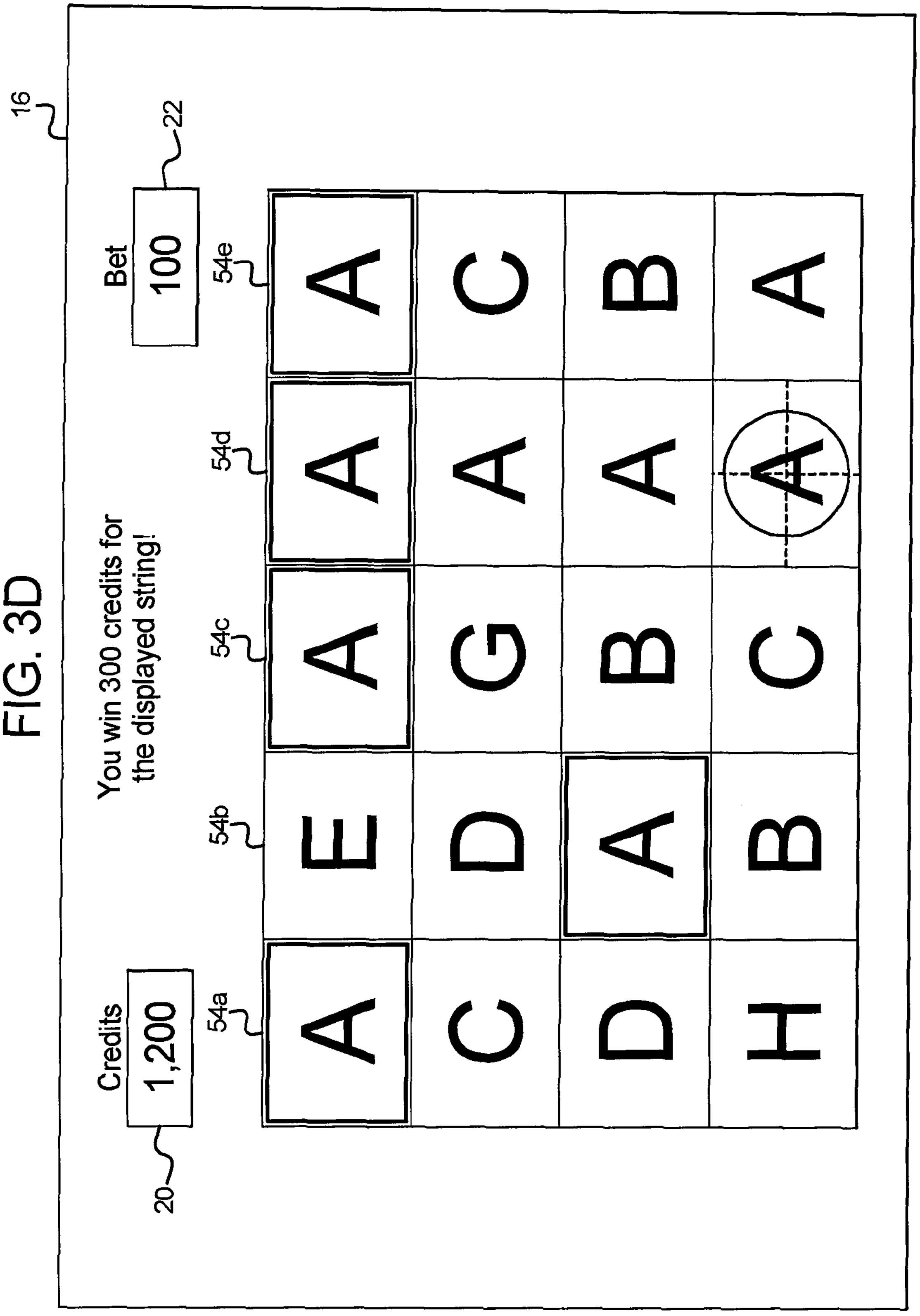

In this embodiment, the expanding symbol is the "A" symbol. It should be appreciated that in various other embodiments, the expanding symbol is any suitable symbol. After the gaming system has caused the vertical expansion of the expanding symbol in FIG. 3C, the gaming system evaluates the symbols for winning symbol combinations using paytable 100 of FIG. 3E. The gaming system determines that the player is entitled to an award of 300 credits for the string including an "A" symbol at each of reels 54*a*, 54*b*, 54*c*, 54*d*, and 54*e*. The gaming system then provides the award of 300 credits to the player, as illustrated in FIG. 3D. The symbol positions including symbols in the string are indicated to the player by highlighting the borders of the respective symbol positions, as illustrated in FIG. 3D. However, it should be appreciated that in various other embodiments, these symbol positions are not indicated to the player or are indicated in any other suitable manner.

It should be appreciated that, as below, various types of symbol expansion (e.g., "book-end" symbol expansion) are described independently. It should be appreciated that such independent disclosure is for purposes of providing background relevant to various embodiments disclosed herein including multiple types of symbol expansion. It should be appreciated that various embodiments of the gaming system disclosed herein may employ any combination or individual type of symbol expansion disclosed herein.

In should be appreciated that in various such embodiments, the path between two generated expanding symbols may extend in a first direction (e.g., horizontally), a second different direction (e.g., vertically), along a payline, or in any suitable direction or combination of directions.

In one such embodiment, a book-end symbol expansion in a first direction can cause an expanding symbol to be displayed at a point of symbol expansion, which ultimately causes a symbol expansion in a second different direction. In other words, in such a game, the gaming system displays an expanding symbol at a point of symbol expansion as a result of one of: (a) randomly generating the expanding symbol at the point of symbol expansion as one of a plurality of randomly generated symbols and (b) causing the expanding symbol to be displayed at the point of symbol expansion as a result of a book-end symbol expansion, but after an initial random generation of a plurality of symbols.

Referring now to FIGS. 4A to 4H, in one embodiment, the gaming system enables: (a) a book-end horizontal symbol expansion in a base game, and (b) both a book-end horizontal symbol expansion and a vertical symbol expansion resulting from a display of an expanding symbol at a point of symbol expansion in any free games triggered during a play of the base game.

It should be appreciated that in various other embodiments, the gaming system may enable both a book-end horizontal symbol expansion and a vertical symbol expansion resulting from a display of an expanding symbol at a point of symbol expansion in a base game or both a base game and a bonus or free game.

Figure 4A:
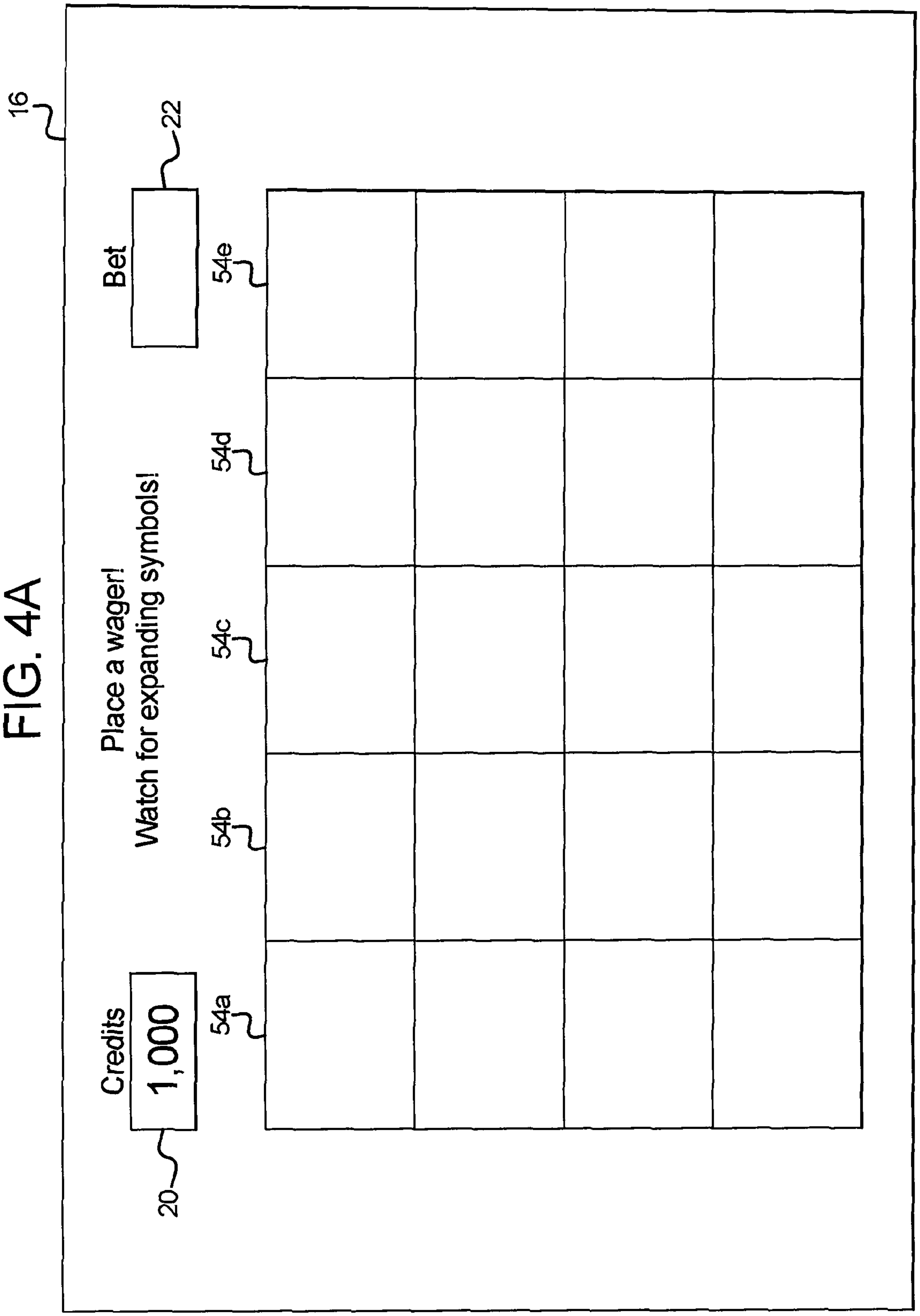
FIGS. 4A, 4B, 4C, 4D, 4E, 4F, 4G and 4H include front views of a gaming device display enabling a play of a wagering game in accordance with one embodiment of the gaming system disclosed herein.
Figure 4B:
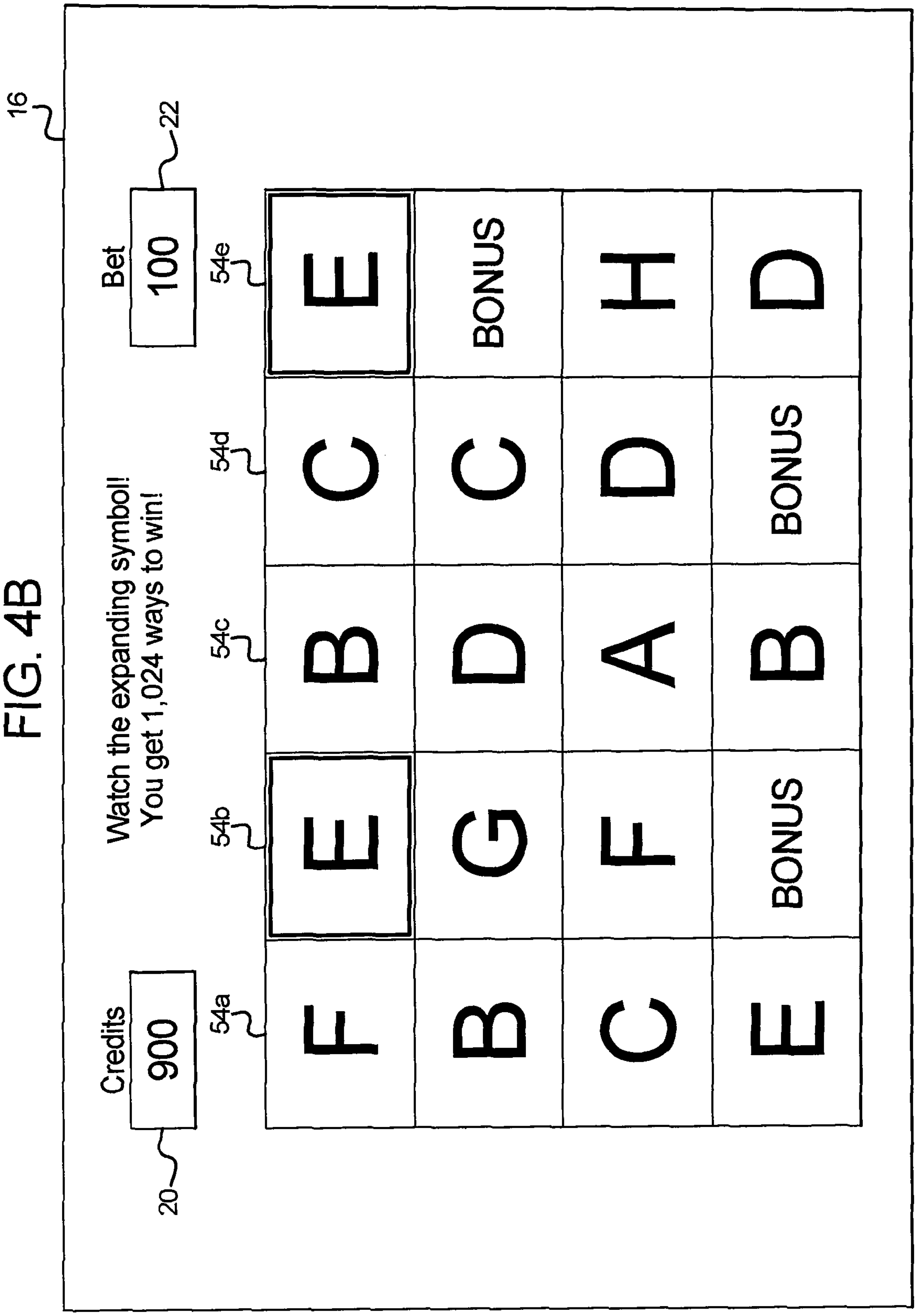

Referring to FIG. 4A, the gaming system instructs the player to place a wager, as illustrated in FIG. 4A. The player inputs a wager of 100 credits as illustrated in bet display 22 in FIG. 4B. In this embodiment, a bet of 100 credits provides a player with 1,024 "ways to win" (discussed above). An explanation of how the gaming system evaluates "ways to win" for winning symbol combinations is also provided above. The gaming system then randomly generates a plurality of symbols at a plurality of symbol positions, as illustrated in FIG. 4B.

The gaming system first determines if two of a same expanding symbol have been generated at symbol positions of a same vertical orientation at different reels, wherein the different reels are separated by at least one reel (i.e., whether to cause a book-end horizontal expansion). In this embodiment, the "E" symbol is an expanding symbol. It should be appreciated that in various other embodiments, the expanding symbol is any suitable symbol. As illustrated in FIG. 4B, the gaming system determines that expanding symbols are displayed at reel 54*b* and reel 54*e* at the same vertical orientation. In this embodiment, the gaming system identifies the symbol positions at which the expanding symbols are generated by highlighting the borders of the symbol positions. It should be appreciated that in various embodiments, the gaming system identifies symbol positions at which expanding symbols are generated in any suitable manner. In various other embodiments, the gaming system does not identify symbol positions at which expanding symbols are generated.

If the gaming system determines that a book-end horizontal symbol expansion has been triggered in the base game, the gaming system causes the expanding symbol to replace the symbols located at each of the symbol positions of the same vertical orientation between the two different reels. As illustrated FIG. 4C, expanding symbols replace the symbols at the top symbol positions of reel 54*c* and reel 54*d.*

Figure 3E:
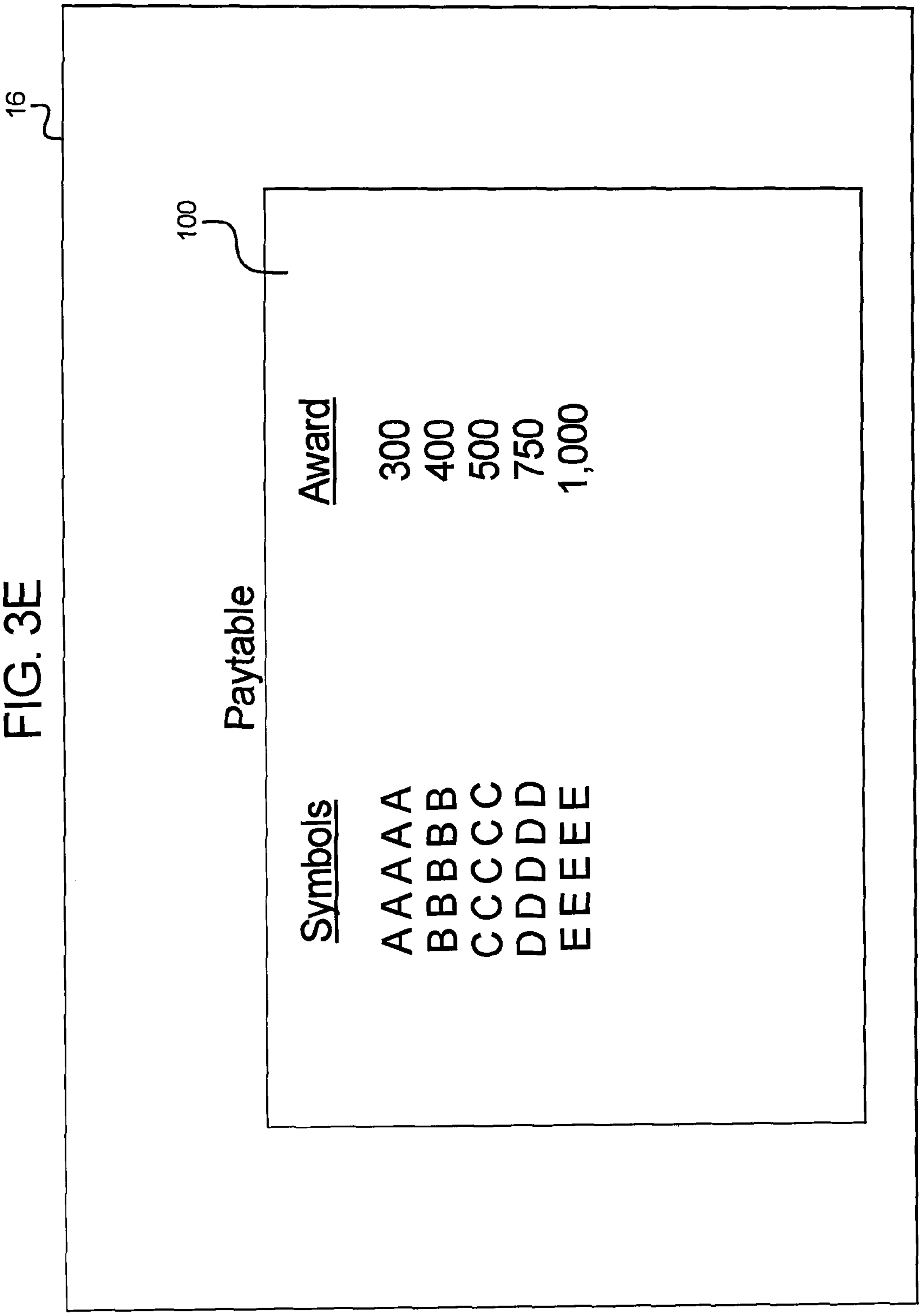
FIG. 3E includes a view of a paytable for a wagering game in accordance with one embodiment of the gaming system disclosed herein.
Figure 4C:
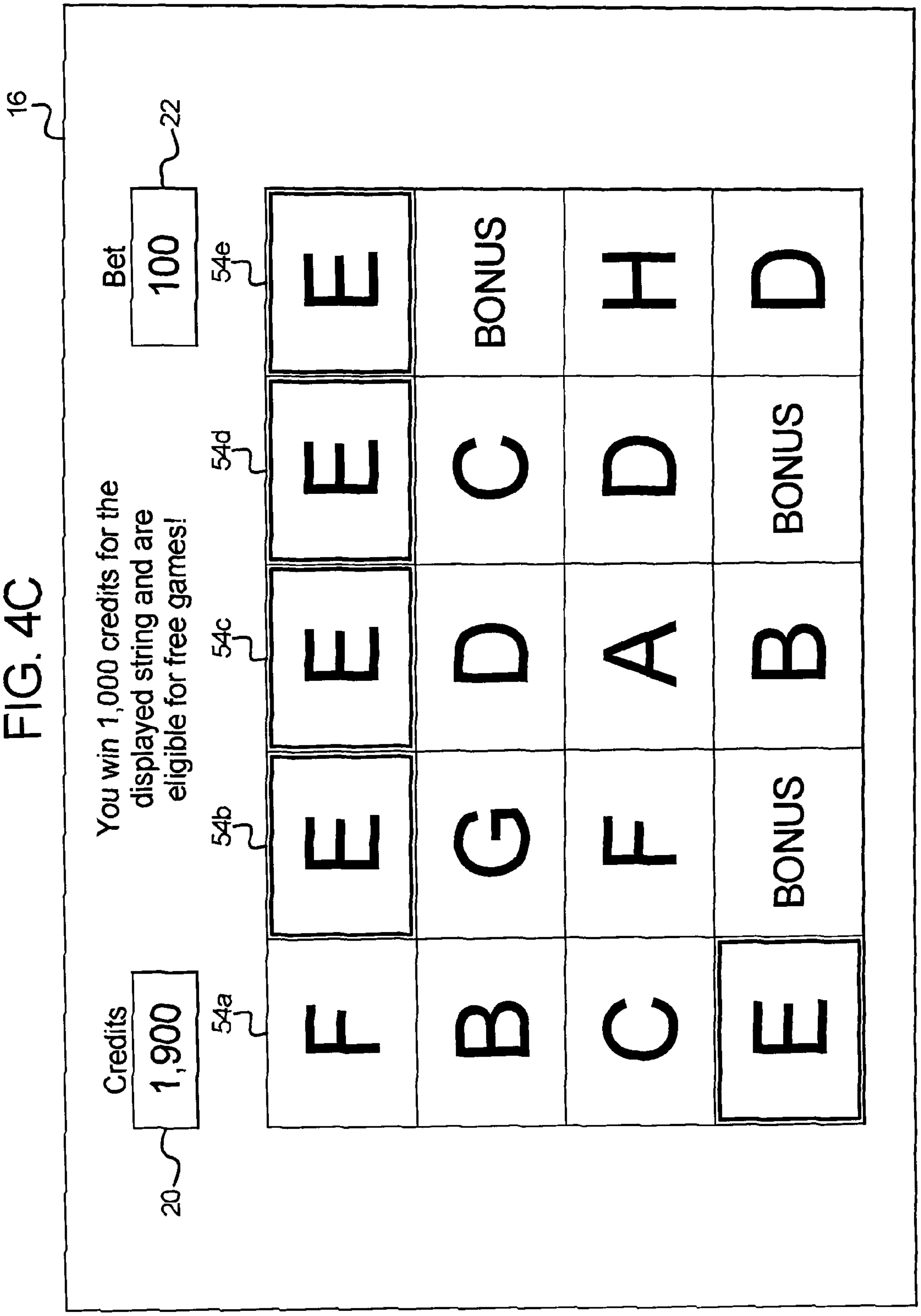

After the gaming system causes the book-end horizontal expansion, the gaming system uses a ways to win evaluation (discussed above) to determine if the player is entitled to any awards for the play of the base game using the paytable illustrated in FIG. 3E. The gaming system determines the player is entitled to an award of 1,000 credits for the string including an "E" symbol at each of reels 54*a*, 54*b*, 54*c*, 54*d*, and 54*e* and provides the player with the 1,000 credit award as illustrated in credit display 20 in FIG. 4C. The symbol positions including symbols in the string are indicated to the player by highlighting the borders of the respective symbol positions, as illustrated in FIG. 4C. However, it should be appreciated that in various other embodiments, these symbol positions are not indicated to the player or are indicated in any other suitable manner.

In this embodiment, after determining if the player is entitled to an award for the play of the base game in FIG. 4C, the gaming system determines if the player is entitled to any free games. In this embodiment, the player is entitled to free games if three bonus symbols are randomly generated at the symbol positions. It should be appreciated that in various embodiments, a bonus game may be triggered by any number of bonus symbols, or be triggered in any other suitable manner.

Although in this embodiment the gaming system determines if the player is entitled to any free games after the gaming system has caused any symbol expansions, it should be appreciated that in various other embodiments, the gaming system determines if the player is entitled to any free games before the gaming system causes any symbol expansions. In such embodiments, bonus symbols cannot be replaced by an expanding symbol during a symbol expansion. In various other embodiments, if an expanding symbol replaces a bonus symbol, the expanding symbol also serves the function of the bonus symbol for purposes of determining free game eligibility.

Figure 4D:
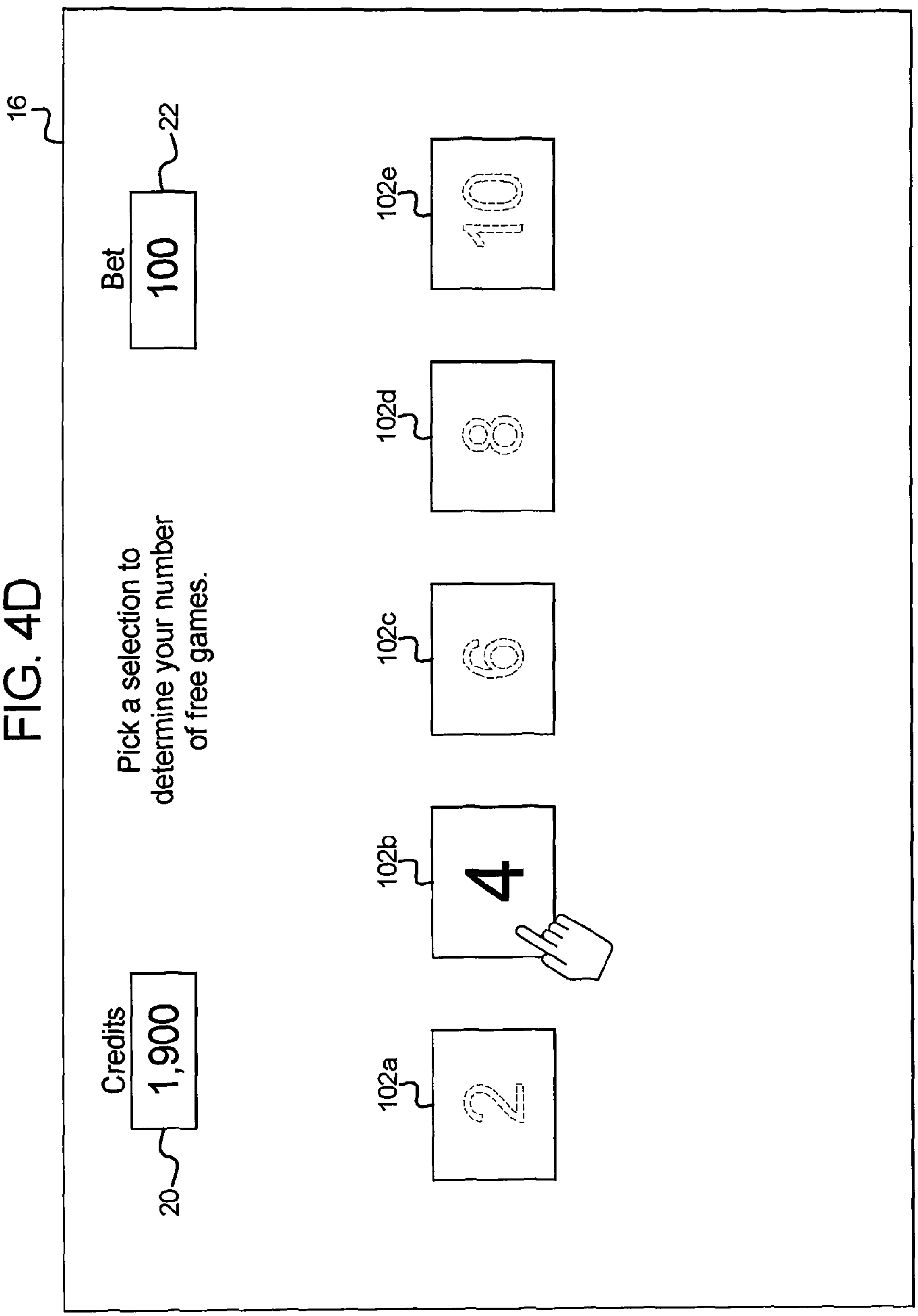

In this embodiment, the gaming system determines whether the player is entitled to any free games, but the player selects how many free games they are awarded. Referring to FIG. 4D, the gaming system displays a plurality of masked selections 102*a*, 102*b*, 102*c*, 102*d* and 102*e*, each associated with a number of free games and prompts the player to pick a selection. The player selects selection 102*b* which is associated with four free games, as illustrated in FIG. 4D.

It should be appreciated that in various embodiments, the gaming system may enable the player to select a number of free games in any suitable manner. In other embodiments, the gaming system selects the number of free games randomly or using any other suitable method.

In this embodiment, the gaming system enables both a book-end horizontal symbol expansion and a vertical symbol expansion resulting from a display of an expanding symbol at a point of symbol expansion in any free games triggered during the play of the base game.

Figure 4E:
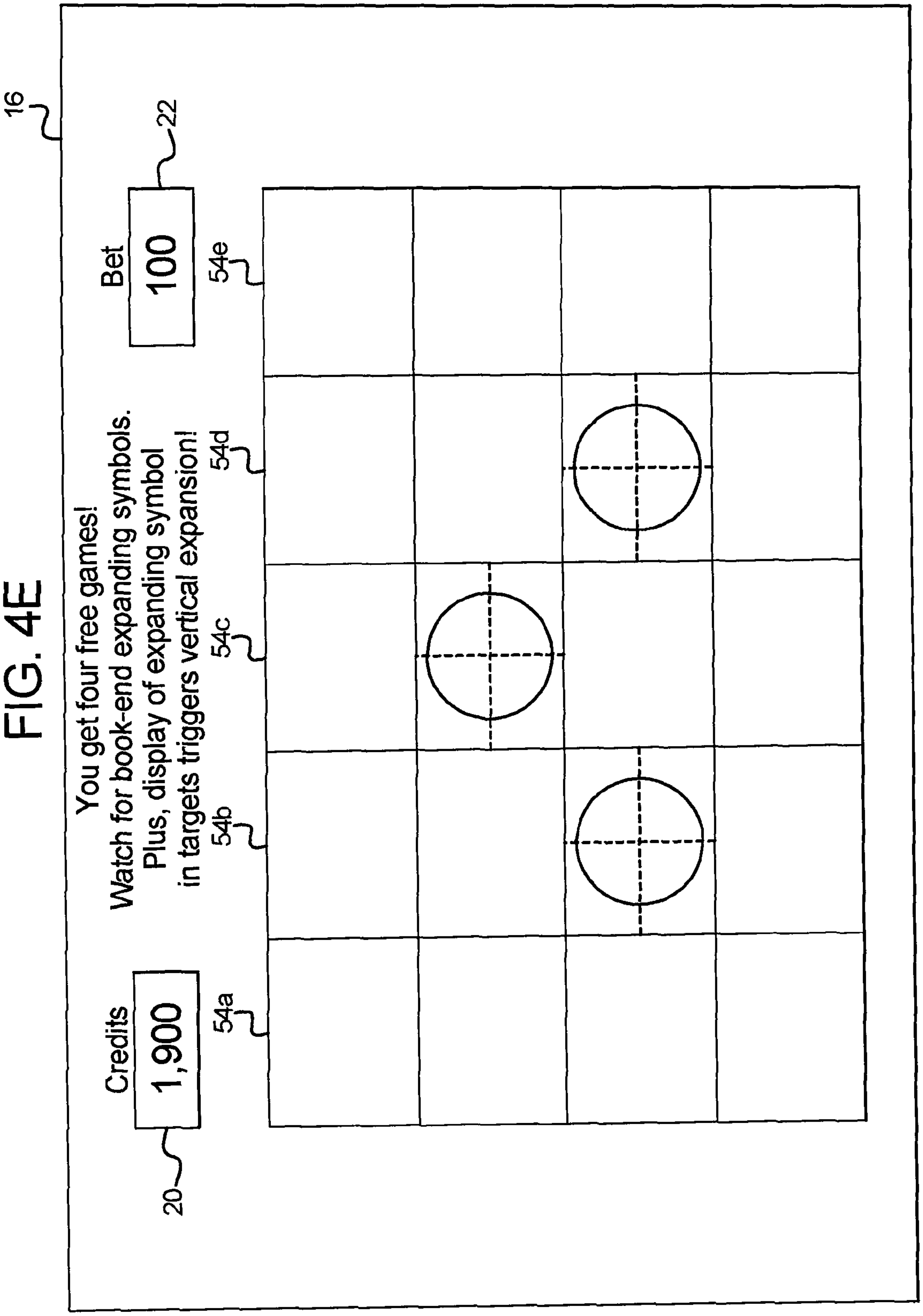
Figure 4F:
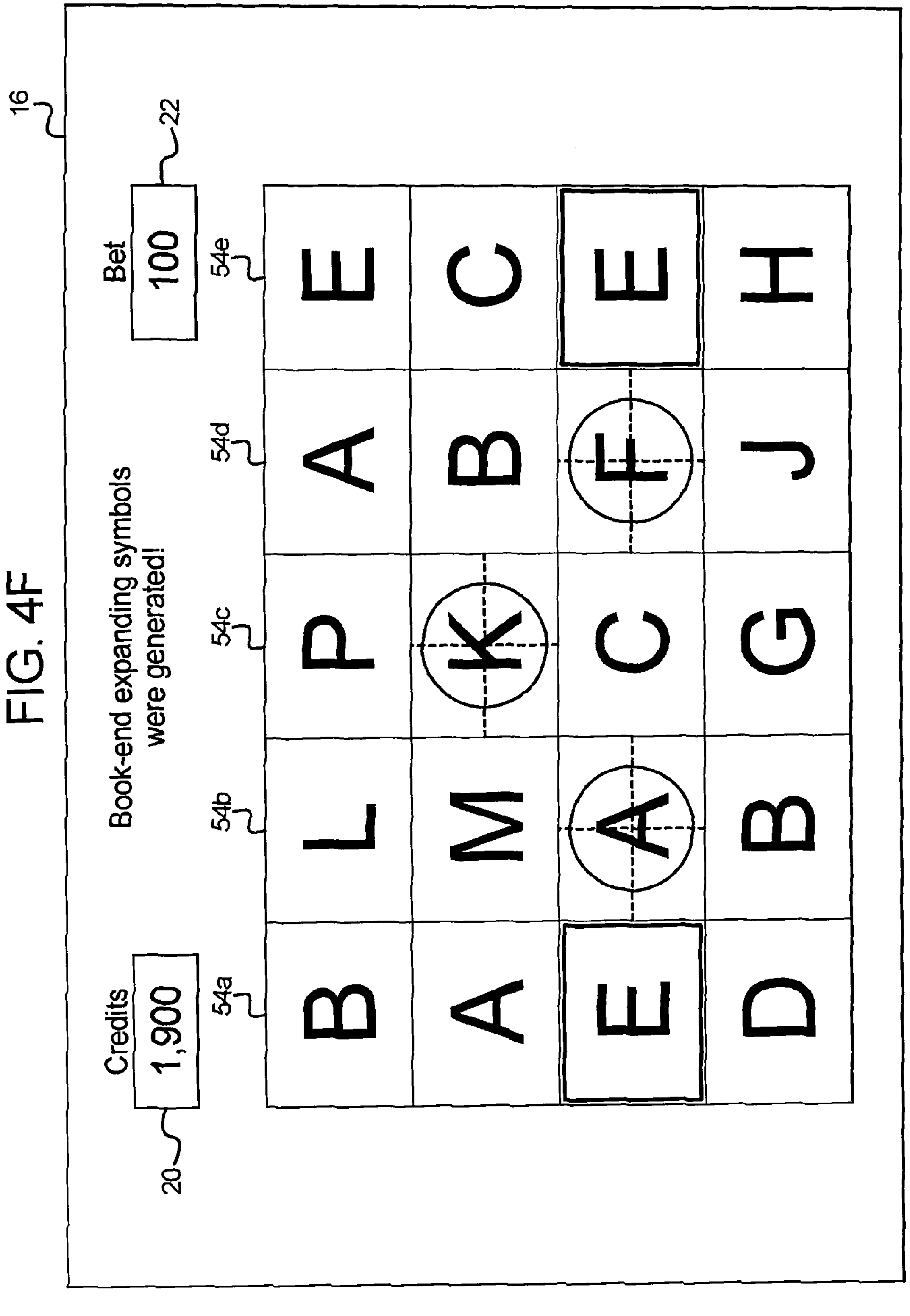
Figure 4G:
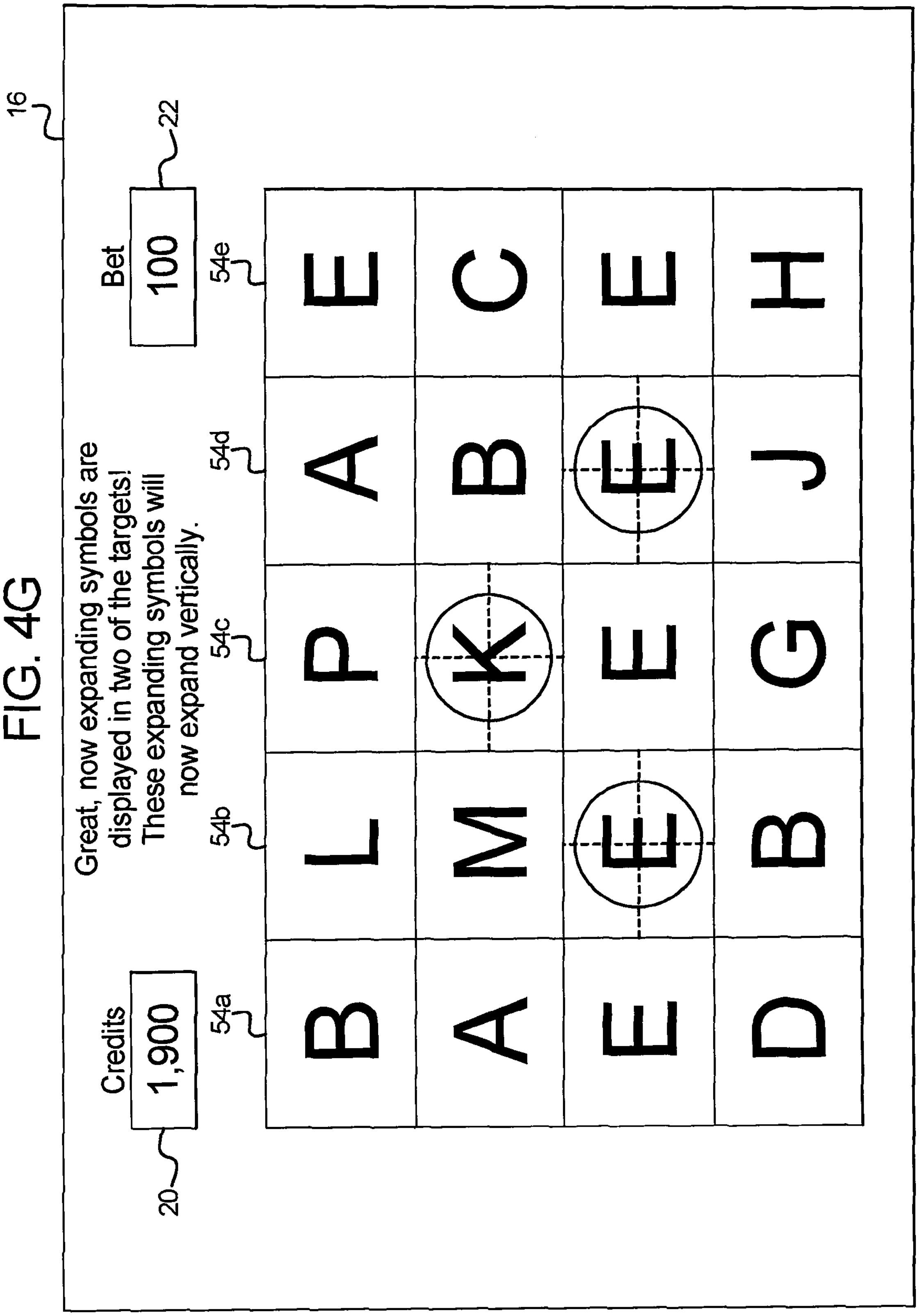

Referring to FIG. 4E, for the first free game (second, third and fourth free games not shown), the gaming system first identifies the points of symbol expansion for the free game at reel 54*b*, reel 54*c* and reel 54*d* to the player by overlaying the respective symbol positions of the points of symbol expansion for the free game with target-like symbols. It should be appreciated that in various other embodiments, the gaming system identifies the points of symbol expansion for the player in other suitable manners. The gaming system then randomly generates a plurality of symbols at a plurality of symbol positions, as illustrated in FIG. 4F.

The gaming system first determines if two of a same expanding symbol have been generated at different reels, wherein the different reels are separated by at least one reel (i.e., whether to cause a book-end horizontal expansion). As illustrated in FIG. 4F, the gaming system determines that expanding symbols are displayed at reel 54*a* and reel 54*e*. In this embodiment, the gaming system identifies the symbol positions at which the expanding symbols are generated by highlighting the borders of the symbol positions. It should be appreciated that in various embodiments, the gaming system identifies symbol positions at which expanding symbols are generated in any suitable manner. In various other embodiments, the gaming system does not identify symbol positions at which expanding symbols are generated.

If the gaming system determines that a book-end horizontal symbol expansion has been triggered in the free game, the gaming system causes the expanding symbol to replace the symbols located along a path defined by a line between the symbol positions at which the expanding symbols were generated (i.e., horizontally). As illustrated FIG. 4G, expanding symbols replace the symbols at the top symbol positions of reel 54*b*, reel 54*c* and reel 54*d.*

Figure 4H:
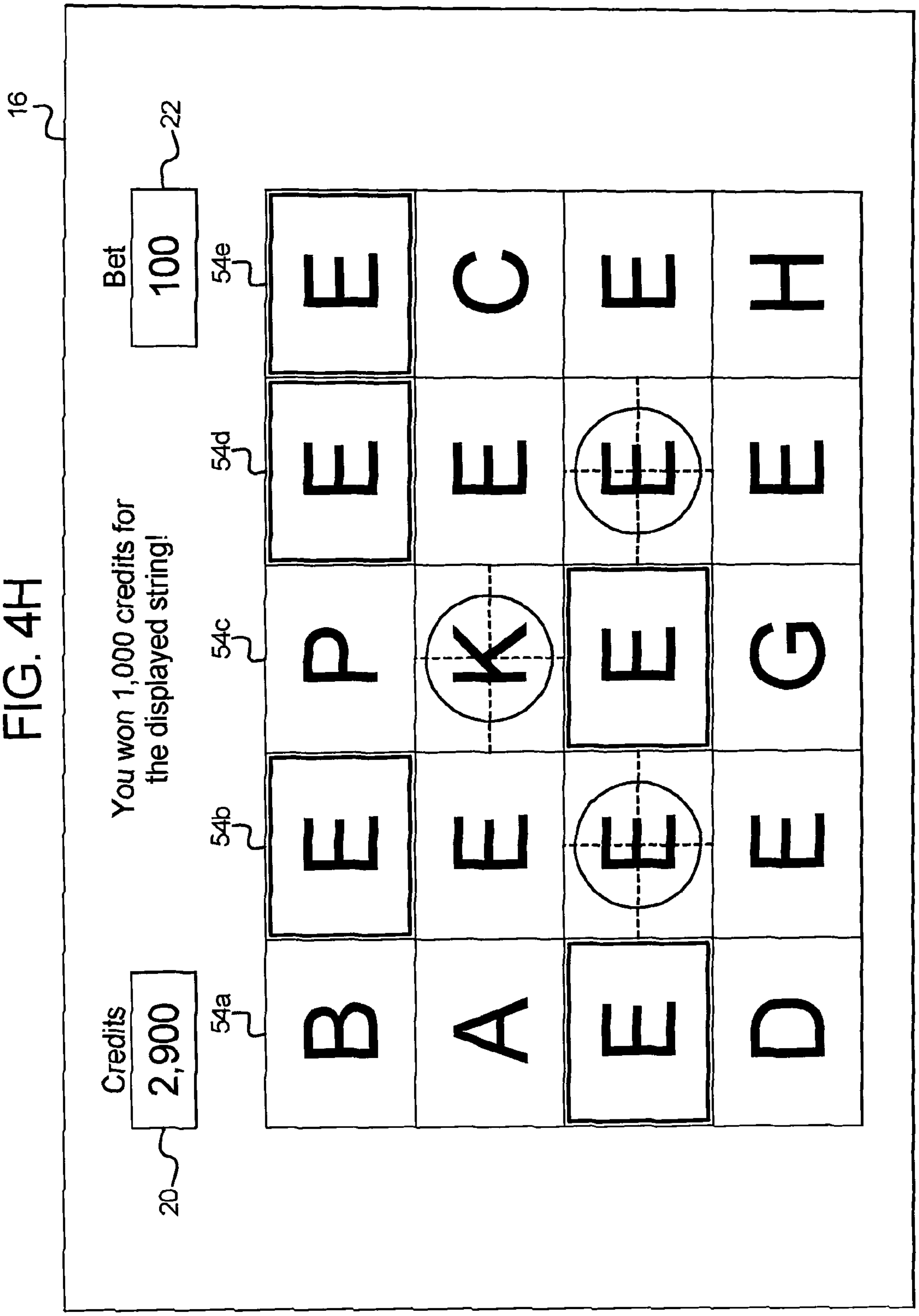

After the gaming system causes the book-end horizontal expansion, the gaming system determines if the expanding symbol is displayed at any of the points of symbol expansion. In this example, the foregoing book-end horizontal symbol expansion causes expanding symbols to be displayed at each of the points of symbol expansion at reel 54*b* and 54*d*. Accordingly, the expanding symbols "expand," replacing the symbols at each of the symbol positions extending above and below the points of symbol expansion at reels 54*b* and 54*d*, as illustrated in FIG. 4H.

The gaming system then uses a multi-way or ways to win evaluation (discussed above) to determine if the player is entitled to any awards for the play of the free game using the paytable illustrated in FIG. 3E. The gaming system determines the player is entitled to an award of 1,000 credits for the string including an "E" symbol at each of reels 54*a*, 54*b*, 54*c*, 54*d* and 54*e* and provides the player with the 1,000 credit award as illustrated in credit display 20 in FIG. 4H. The symbol positions including symbols in the string are indicated to the player by highlighting the borders of the respective symbol positions, as illustrated in FIG. 4H. However, it should be appreciated that in various other embodiments, these symbol positions are not indicated to the player or are indicated in any other suitable manner.

It should be appreciated that in various embodiments the gaming system evaluates the symbols for winning symbol combinations at one or more of the following points in time: (a) before any book-end symbol expansions or symbol expansions resulting from the expanding symbol being displayed at one or more points of symbol expansion; (b) after any book-end symbol expansions but before any symbol expansions resulting from the expanding symbol being displayed at one or more points of symbol expansion; and (c) after any book-end symbol expansions and any symbol expansions resulting from the expanding symbol being displayed at one or more points of symbol expansion.

It should be appreciated that in various other embodiments of a game employing both horizontal and vertical symbol expansion, various combinations of symbol expansion may be available for a play of the game. For example, in one embodiment, the gaming system first causes a horizontal symbol expansion if the expanding symbol is randomly generated at a designated symbol position, which causes the expanding symbol to replace all symbols at the symbol positions both to the left and the right of the designated position. Then, if the gaming system determines that the expanding symbol is displayed at the at least one point of symbol expansion, the gaming system causes the expanding symbol to expand vertically to replace each of the symbols at the symbol positions above and below the at least one point of symbol expansion.

In another embodiment, the gaming system first causes a vertical symbol expansion if the expanding symbol is randomly generated at a designated symbol position, which causes the expanding symbol to replace the symbols at each of the symbol positions above and below the designated symbol position. Then, if the gaming system determines that the expanding symbol is displayed at the at least one point of symbol expansion, the gaming system causes the expanding symbol to expand horizontally to replace each of the symbols at each symbol position to the left and the right of the at least one point of symbol expansion.

In another embodiment, the gaming system first causes a book-end vertical symbol expansion if two expanding symbols are randomly generated at a same reel separated by at least one symbol position, which causes the expanding symbol to replace each of the symbols at the symbol positions vertically between the randomly generated expanding symbols. Then, if the gaming system determines that the expanding symbol is displayed at the at least one point of symbol expansion, the gaming system causes the expanding symbol to expand horizontally to replace each of the symbols at the symbol positions to the left and the right of the at least one point of symbol expansion.

Although in the above examples, the game includes one expanding symbol, it should be appreciated that in various other embodiments, the game includes a plurality of different expanding symbols. For example, in one embodiment, after any book-end horizontal symbol expansions have taken place, if a first expanding symbol is displayed at a first point of symbol expansion, the gaming system causes the first expanding symbol to replace each symbol at the symbol positions above and below the first point of symbol expansion. If a second different expanding symbol is displayed at a second point of symbol expansion, the gaming system causes the second expanding symbol to replace each symbol at the symbol positions above and below the second point of symbol expansion.

In various embodiments including more than one expanding symbol, scenarios are possible in which one expanding could "expand" over another different expanding symbol. In certain such embodiments, when this happens, the gaming system displays a special symbol including both different expanding symbols which functions as either of the different expanding symbols. In other such embodiments, whichever expanding symbol "expands" over another expanding symbol replaces that expanding symbol.

Figure 5A:
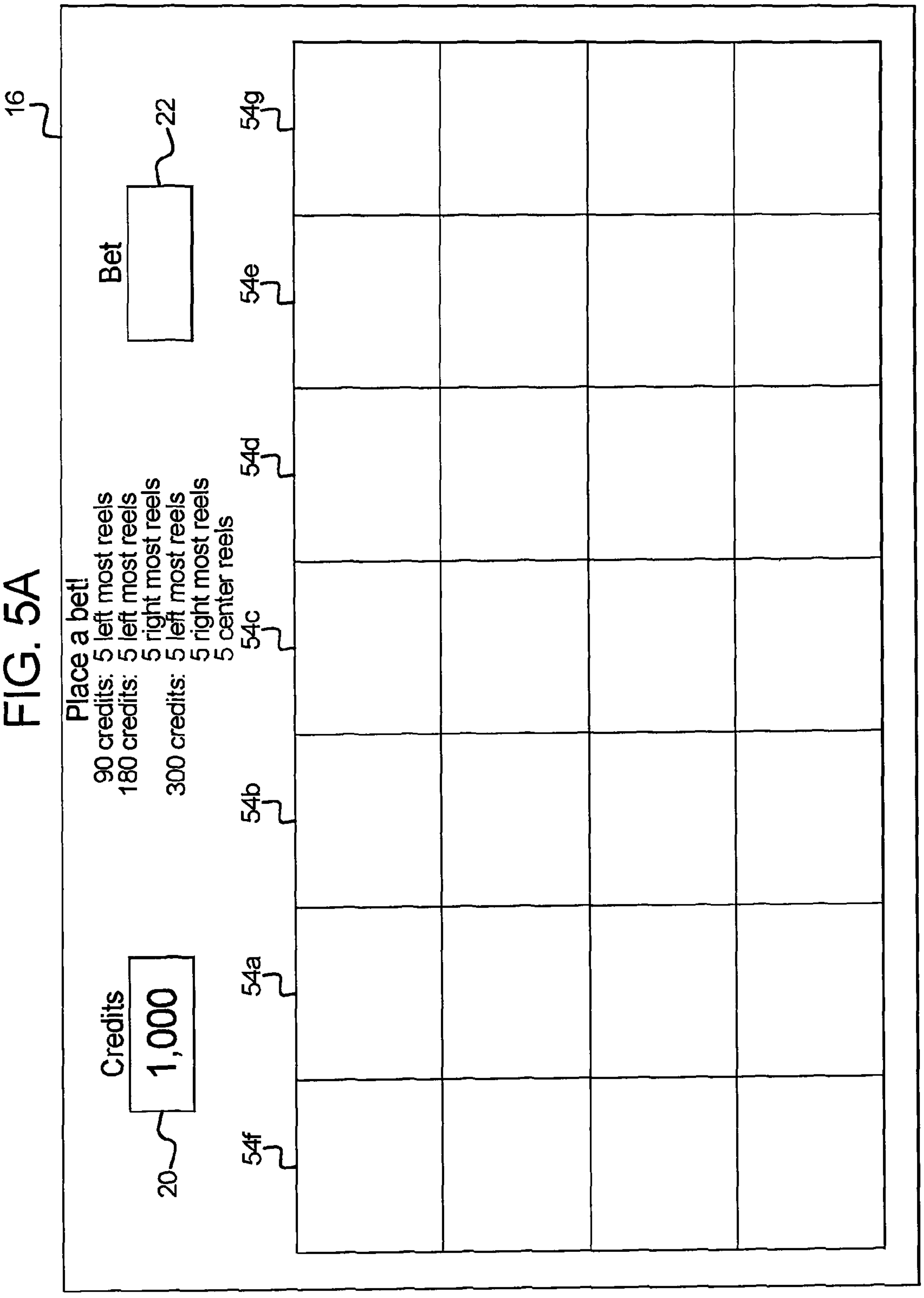
FIGS. 5A, 5B, 5C and 5D include front views of a gaming device display enabling a play of a wagering game in accordance with one embodiment of the gaming system disclosed herein.

Referring to FIG. 5A, in another embodiment, the game includes additional reels 54*f* and 54*g*. However, in this embodiment, although the game includes seven reels 54*a*, 54*b*, 54*c*, 54*d*, 54*e*, 54*f*, and 54*g*, five reels at a time are evaluated for winning symbol combinations. In various such embodiments, the five reels, or different groups of five reels, which are evaluated for winning symbol combinations are based on the wager input by the player.

For example, referring to FIG. 5A, in this embodiment, if the player inputs a wager of 90 credits, the gaming system evaluates the five leftmost reels 54*f*, 54*a*, 54*b*, 54*c* and 54*d* for winning symbol combinations. If the player inputs a wager of 180 credits, the gaming system evaluates both: (a) the five leftmost reels 54*f*, 54*a*, 54*b*, 54*c*, and 54*d*, and (b) the five rightmost reels 54*b*, 54*c*, 54*d*, 54*e*, and 54*g* for winning symbol combinations. If the player inputs a wager of 300 credits, the gaming system evaluates each of: (a) the five leftmost reels 54*f*, 54*a*, 54*b*, 54*c*, and 54*d*; (b) the five rightmost reels 54*b*, 54*c*, 54*d*, 54*e*, and 54*g*; and (c) the center five reels 54*a*, 54*b*, 54*c*, 54*d*, and 54*e* for winning symbol combinations.

It should be appreciated that in various embodiments, the gaming system may evaluate any different combination of five reels based on the wager input by the player. Further, although in this embodiment, the groups of reels which are evaluated for winning symbol combinations are determined based on the wager input by the player, in various other embodiments, the reels which are evaluated for winning symbol combinations may be based on any other suitable criteria. It should also be appreciated that in various other embodiments, the group or groups of reels the gaming system evaluates may include any suitable number of reels (e.g., four or six).

Figure 5B:
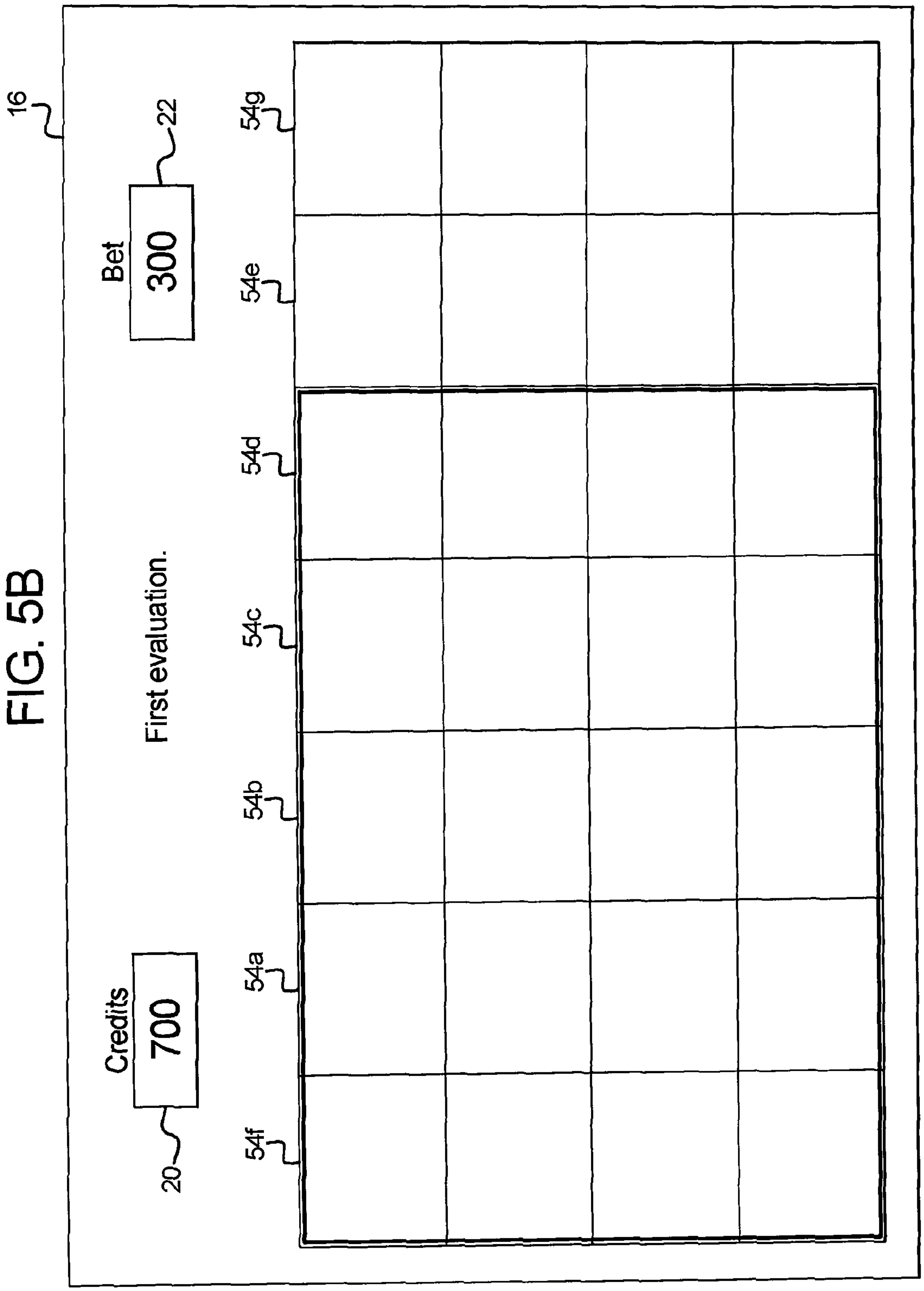
Figure 5C:
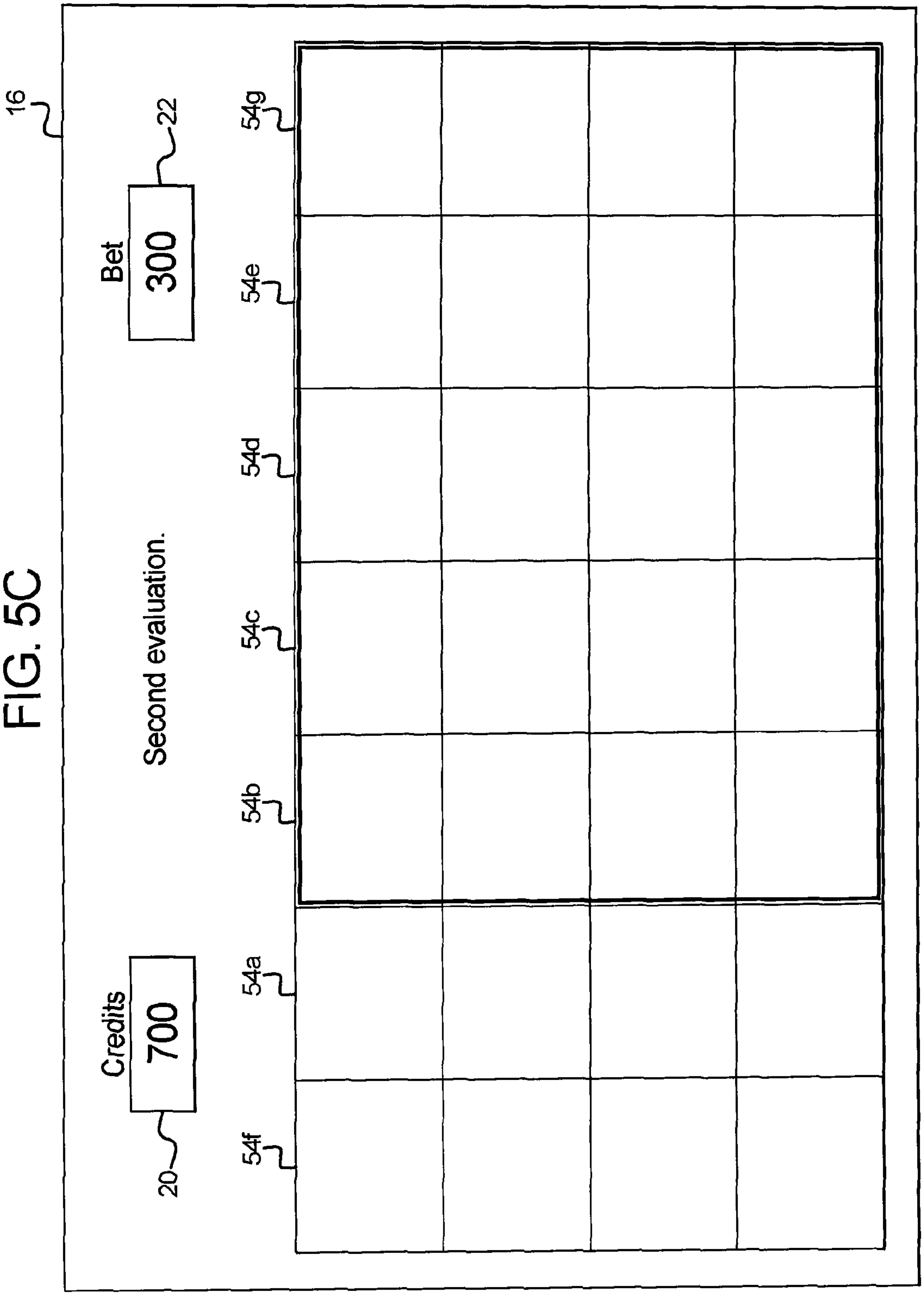
Figure 5D:
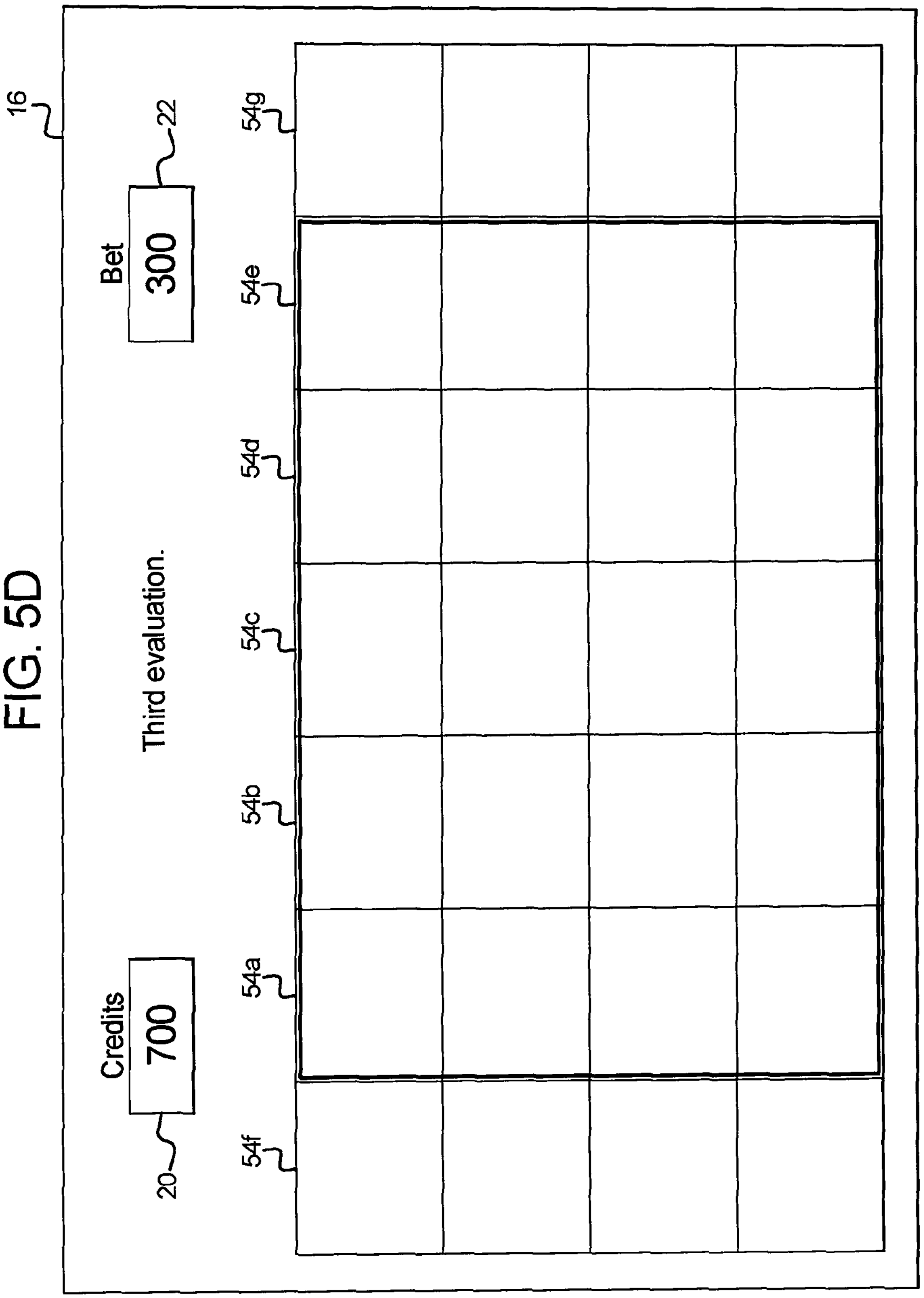

For illustrative purposes, FIGS. 5B, 5C and 5D show the combinations of reels which would be evaluated if the player wagered 300 credits in response to the prompt of FIG. 3A, with the evaluated reels highlighted by a bold border. These figures are for illustrative purposes and do not include generated symbols. If the players wagers 300 credits, the gaming system would first evaluate reels 54*f*, 54*a*, 54*b*, 54*c*, and 54*d* as illustrated in FIG. 5B; then evaluate reels 54*b*, 54*c*, 54*d*, 54*e*, and 54*g* as illustrated in FIG. 5C; and finally evaluate reels 54*a*, 54*b*, 54*c*, 54*d*, and 54*e* as illustrated in FIG. 5D. After evaluating each respective group of reels, the gaming system provides the player with any determined awards. In this embodiment, the gaming system displays the award determined for an evaluation of a group of reels after each respective evaluation. In various other embodiments, the gaming system displays the awards determined for evaluations of any groups of reels collectively after the gaming system has evaluated all of the groups of reels.

It should be appreciated that in various such embodiments, the respective groups of reels may be evaluated in any order. For example, the gaming system could first evaluate reels 54_a_, 54_b_, 54_c_, 54_d_, and 54_e_ for winning combinations, then evaluate reels 54_b_, 54_c_, 54_d_, 54_e_, and 54_g_ for winning combinations, and finally evaluate reels 54_f_, 54_a_, 54_b_, 54_c_, and 54_d_ for winning combinations.

It should also be appreciated that the evaluation of different groups of reels illustrated in FIGS. 5A to 5D may be part of a base game, a free or bonus game, or both a base game and a free or bonus game of any of the foregoing embodiments. It should be appreciated that in various embodiments in which the evaluation of different groups of reels as illustrated in FIGS. 5A to 5D is part of a free game or a both a base game and a free game, the one or more groups of reels the gaming system evaluates are determined based on the wager input for the base game.

It should be appreciated that in various embodiments, the games described in any of the above examples or any example discussed herein may be a base game, a bonus or free game or any suitable game.

It should be appreciated that in various embodiments employing vertical symbol expansion, the gaming system includes independent reels (e.g., symbol displayed at each of a plurality of different symbol positions are generated by a respective independent reel associated with that symbol position).

In various embodiments, the gaming system only activates at least one point of symbol expansion if a threshold wager is placed on a base game. It should be appreciated that in various embodiments, points of symbol expansion may be activated automatically or based on any suitable criteria.

In various embodiments, any of the symbol expansions disclosed herein may cause a same expanding symbol to replace each of the symbols at symbol positions which are part of the respective symbol expansion. In various other embodiments, different symbols are part of at least one symbol expansion (e.g., wild or multiplier symbols mixed in with other different expanding symbols).

It should be appreciated that each of the foregoing examples are for illustrative purposes and that any of the features of any of the examples or other disclosure herein may be combined in any manner.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one input device;

at least one display device;

at least one processor; and at least one memory device storing a plurality of instructions which, when executed by the at least one processor, cause the at least one processor to operate with the at least one input device and the at least one display device for a play of a game, upon an input of a wager, to:

(a) designate at least one symbol position of a plurality of symbol positions as a point of symbol expansion;

(b) thereafter, display a plurality of randomly generated symbols at the plurality of symbol positions;

(c) determine if two expanding symbols are displayed at symbol positions which are separated by at least one symbol position;

(d) if two expanding symbols are displayed at symbol positions which are separated by at least one symbol position, cause the expanding symbol to replace each of the symbols displayed at the symbol positions along a path between said symbol positions;

(e) determine if any expanding symbol is displayed at the point of symbol expansion;

(f) if any expanding symbol is displayed at the point of symbol expansion, cause the expanding symbol to replace each of the symbols displayed at the symbol positions extending a first direction from the point of symbol expansion;

(g) after causing the expanding symbol to replace any symbols in (d) and (f), evaluate the plurality of randomly generated symbols for displayed winning symbol combinations; and (h) provide any awards associated with any displayed winning symbol combinations to a player.

2. The gaming system of claim 1, wherein the first direction is selected from the group consisting of: (a) vertical and (b) horizontal.

3. The gaming system of claim 1, wherein the plurality of instructions, when executed by the at least one processor, cause the at least one processor to operate with the at least one input device and the at least one display device to, if the expanding symbol is displayed at the point of symbol expansion, cause the expanding symbol to replace each of the symbols displayed at the symbol positions extending a second direction from the point of symbol expansion.

4. The gaming system of claim 1, wherein the plurality of instructions, when executed by the at least one processor, cause the at least one processor to operate with the at least one input device and the at least one display device to evaluate the plurality of randomly generated symbols for displayed winning symbol combinations by determining if any winning symbol combinations have been displayed on one or more wagered-on paylines.

5. The gaming system of claim 1, wherein the plurality of instructions, when executed by the at least one processor, cause the at least one processor to operate with the at least one input device and the at least one display device to evaluate the plurality of randomly generated symbols for displayed winning symbol combinations by determining if a designated number of associated symbols are displayed at active symbol positions at a designated number of adjacent reels.

6. The gaming system of claim 1, wherein the plurality of instructions, when executed by the at least one processor, cause the at least one processor to operate with the at least one input device and the at least one display device to determine if the expanding symbol is displayed at the point of symbol expansion if the wager is equal to or above a designated amount.

7. The gaming system of claim 1, wherein the plurality of randomly generated symbols include a plurality of different expanding symbols.

8. The gaming system of claim 7, wherein the plurality of instructions, when executed by the at least one processor, cause the at least one processor to operate with the at least one input device and the at least one display device to, if different expanding symbols are displayed at different respective points of symbol expansion, cause each of the different expanding symbols to replace each of the symbols displayed at the symbol positions extending a first direction from the respective points of symbol expansion.

9. The gaming system of claim 1, wherein the game is a primary or base game.

10. The gaming system of claim 1, wherein the game is a free or bonus game.

11. The gaming system of claim 1, wherein the plurality of randomly generated symbols are displayed at a plurality of symbol positions of a plurality of reels.

12. The gaming system of claim 11, wherein the plurality of instructions, when executed by the at least one processor, cause the at least one processor to operate with the at least one input device and the at least one display device to evaluate the plurality of randomly generated symbols for displayed winning symbol combinations in (g) by at least one of:

(i) evaluating a first plurality of symbols of a first group of the plurality of reels for winning symbol combinations;

(ii) evaluating a second plurality of symbols of a second group of the plurality of reels for winning symbol combinations; and (iii) evaluating a third plurality of symbols of a third group of the plurality of reels for winning symbol combinations.

13. The gaming system of claim 12, wherein the plurality of instructions, when executed by the at least one processor, cause the at least one processor to operate with the at least one input device and the at least one display device to determine which of the groups of reels to evaluate based on the wager.

14. The gaming system of claim 13, wherein different wager amounts are associated with different numbers of groups of reels.

15. The gaming system of claim 13, wherein different wager amounts are associated with different respective groups of reels.

16. The gaming system of claim 1, wherein the plurality of instructions, when executed by the at least one processor, cause the at least one processor to operate with the at least one input device and the at least one display device to make one or more additional evaluations of the plurality of randomly generated symbols for displayed winning symbol combinations and provide any awards to the player for said additional evaluation at one or more times selected from the group consisting of: (i) before (c), and (ii) after (d) but before (e).

17. The gaming system of claim 1, wherein the expanding symbol is a wild symbol.

18. The gaming system of claim 1, wherein the path between the symbol positions at which the expanding symbols are displayed which are separated by at least one symbol position extends in one or more directions selected from the group consisting of: (a) horizontally, (b) vertically, and (c) along a payline.

19. A method of operating a gaming system, the method comprising:

causing at least one processor to operate with at least one display device to:

(a) designate at least one symbol position of a plurality of symbol positions as a point of symbol expansion;

(b) thereafter, display a plurality of randomly generated symbols at the plurality of symbol positions;

(c) determine if two expanding symbols are displayed at symbol positions which are separated by at least one symbol position;

(d) if two expanding symbols are displayed at symbol positions which are separated by at least one symbol position, cause the expanding symbol to replace each of the symbols displayed at the symbol positions along a path between said symbol positions;

(e) determine if any expanding symbol is displayed at the point of symbol expansion;

(f) if any expanding symbol is displayed at the point of symbol expansion, cause the expanding symbol to replace each of the symbols displayed at the symbol positions extending a first direction from the point of symbol expansion;

(g) after causing the expanding symbol to replace any symbols in (d) and (f), evaluate the plurality of symbols for displayed winning symbol combinations; and (h) provide any awards associated with any displayed winning symbol combinations to a player.

20. The method of claim 19, wherein the first direction is selected from the group consisting of: (a) vertical and (b) horizontal.

21. The method of claim 19, which includes, if the expanding symbol is displayed at the point of symbol expansion, causing the at least one processor to operate with the at least one display device to cause the expanding symbol to replace each of the symbols displayed at the symbol positions extending a second direction from the point of symbol expansion.

22. The method of claim 19, which includes causing the at least one processor to evaluate the plurality of randomly generated symbols for displayed winning symbol combinations by determining if any winning symbol combinations have been displayed on one or more wagered-on paylines.

23. The method of claim 19, which includes causing the at least one processor to evaluate the plurality of randomly generated symbols for displayed winning symbol combinations by determining if a designated number of associated symbols are displayed at active symbol positions at a designated number of adjacent reels.

24. The method of claim 19, which includes causing the at least one processor to determine if the expanding symbol is displayed at the point of symbol expansion if the wager is equal to or above a designated amount.

25. The method of claim 19, which includes causing the at least one processor to cause the plurality of randomly generated symbols to include a plurality of different expanding symbols.

26. The method of claim 19, which includes, if different expanding symbols are displayed at different respective points of symbol expansion, causing the at lest one processor to operate with the at least one display device to cause each of the different expanding symbols to replace each of the symbols displayed at the symbol positions extending a first direction from the respective points of symbol expansion.

27. The method of claim 19, which includes providing the game as a primary or base game.

28. The method of claim 19, which includes providing the game as a free or bonus game.

29. The method of claim 19, which includes causing the at least one processor to operate with the at least one display device to display the plurality of randomly generated symbols at a plurality of symbol positions of a plurality of reels.

30. The method of claim 29, which includes causing the at least one processor to evaluate the plurality of randomly generated symbols for displayed winning symbol combinations in (g) by at least one of:

(i) evaluating a first plurality of symbols of a first group of the plurality of reels for winning symbol combinations;

(ii) evaluating a second plurality of symbols of a second group of the plurality of reels for winning symbol combinations; and (iii) evaluating a third plurality of symbols of a third group of the plurality of reels for winning symbol combinations.

31. The method of claim 30, which includes causing the at least one processor to determine which of the groups of reels to evaluate based on the wager.

32. The method of claim 31, which includes causing the at least one processor to associate different wager amounts with different numbers of groups of reels.

33. The method of claim 31, which includes causing the at least one processor to associate different wager amounts with different respective groups of reels.

34. The method of claim 19, which includes causing the at least one processor to make one or more additional evaluations of the plurality of randomly generated symbols for displayed winning symbol combinations and providing any awards to the player for said additional evaluation at one or more times selected from the group consisting of: (i) before (c), and (ii) after (d) but before (e).

35. The method of claim 19, which includes causing the at least one processor to cause the expanding symbol to be a wild symbol.

36. The method of claim 19, wherein the path between the symbol positions at which the expanding symbols are displayed which are separated by at least one symbol position extends in one or more directions selected from the group consisting of: (a) horizontally, (b) vertically, and (c) along a payline.

37. The method of claim 19, which is provided through a data network.

38. The method of claim 37, wherein the data network is an internet.

* * * * *

UNITED STATES PATENT AND TRADEMARK OFFICE

CERTIFICATE OF CORRECTION

PATENT NO. : 8,226,468 B2
APPLICATION NO. : 12/270250
DATED : July 24, 2012
INVENTOR(S) : Benjamin C. Hoffman et al.

It is certified that error appears in the above-identified patent and that said Letters Patent is hereby corrected as shown below:

In Claim 16, Column 27, Lines 46 to 47, replace “additional evaluation” with --one or more additional evaluations--.
In Claim 18, Column 27, Line 53, between “by” and “at” insert --the--.
In Claim 26, Column 28, Line 49, replace “lest” with --least--.
In Claim 34, Column 30, Line 2, replace “additional evaluation” with --one or more additional evaluations--.
In Claim 36, Column 30, Line 10, between “by” and “at” insert --the--.

Signed and Sealed this
Twenty-fifth Day of December, 2012

David J. Kappos
*Director of the United States Patent and Trademark Office*